United States Patent
Park et al.

(10) Patent No.: US 11,702,488 B2
(45) Date of Patent: Jul. 18, 2023

(54) POLYETHYLENE AND CHLORINATED POLYETHYLENE THEREOF

(71) Applicant: LG Chem, Ltd., Seoul (KR)

(72) Inventors: Sunghyun Park, Daejeon (KR); Si Jung Lee, Daejeon (KR); Bog Ki Hong, Daejeon (KR); Yi Young Choi, Daejeon (KR); Myunghan Lee, Daejeon (KR)

(73) Assignee: LG Chem, Ltd.

(*) Notice: Subject to any disclaimer, the term of this patent is extended or adjusted under 35 U.S.C. 154(b) by 317 days.

(21) Appl. No.: 17/052,726

(22) PCT Filed: Aug. 30, 2019

(86) PCT No.: PCT/KR2019/011171
§ 371 (c)(1),
(2) Date: Nov. 3, 2020

(87) PCT Pub. No.: WO2020/046051
PCT Pub. Date: Mar. 5, 2020

(65) Prior Publication Data
US 2021/0230324 A1    Jul. 29, 2021

(30) Foreign Application Priority Data

Aug. 30, 2018 (KR) .................. 10-2018-0102925
Aug. 28, 2019 (KR) .................. 10-2019-0105962

(51) Int. Cl.
C08F 110/02    (2006.01)
C08F 4/6592    (2006.01)
C08F 4/659     (2006.01)
C08F 8/20      (2006.01)

(52) U.S. Cl.
CPC ........ *C08F 110/02* (2013.01); *C08F 4/65912* (2013.01); *C08F 4/65927* (2013.01); *C08F 8/20* (2013.01)

(58) Field of Classification Search
CPC ..... C08F 110/02; C08F 210/16; C08F 4/6592
See application file for complete search history.

(56) References Cited

U.S. PATENT DOCUMENTS

| | | | |
|---|---|---|---|
| 5,541,002 A | 7/1996 | Hosoi et al. | |
| 5,914,289 A | 6/1999 | Razavi | |
| 2010/0121006 A1 | 5/2010 | Cho et al. | |
| 2014/0087987 A1* | 3/2014 | Crowther | C08F 10/02 508/591 |
| 2015/0080540 A1 | 3/2015 | Zhao et al. | |
| 2016/0229931 A1 | 8/2016 | Yoo et al. | |
| 2017/0009049 A1* | 1/2017 | Al-Harthi | C08F 110/02 |
| 2017/0369612 A1* | 12/2017 | Dreng | C08F 210/16 |
| 2019/0086308 A1 | 3/2019 | Lee et al. | |
| 2019/0211122 A1 | 7/2019 | Lee et al. | |

FOREIGN PATENT DOCUMENTS

| | | |
|---|---|---|
| CN | 101679540 A | 3/2010 |
| CN | 102627710 A | 8/2012 |
| EP | 3235834 A1 | 10/2017 |
| EP | 3517976 A1 | 7/2019 |
| EP | 3640294 A1 | 4/2020 |
| EP | 3714975 A1 | 9/2020 |
| EP | 3715384 A1 | 9/2020 |
| JP | H05186519 A | 7/1993 |
| JP | H0693018 A | 4/1994 |
| JP | H0762020 A | 3/1995 |
| JP | 2004131718 A | 4/2004 |
| JP | 2017025339 A | 2/2017 |
| KR | 20040076965 A | 9/2004 |
| KR | 20110118250 A | 10/2011 |
| KR | 101597421 B1 | 2/2016 |
| KR | 101603407 B1 | 3/2016 |
| KR | 20160045434 A | 4/2016 |
| KR | 20160121940 A | 10/2016 |
| KR | 20180046291 A | 5/2018 |
| KR | 20180058574 A | 6/2018 |
| WO | 2004076502 A1 | 9/2004 |
| WO | 2016167547 A1 | 10/2016 |
| WO | 2018088725 A1 | 5/2018 |

OTHER PUBLICATIONS

International Search Reprot for Application No. PCT/KR2019/011171 dated Dec. 12, 2019, 2 pages.
Extended European Srarch Report for Application No. 19853688.0, dated Aug. 9, 2021, 8 pages.
Huang Yan-Ling et al: "The effect of molecular weight on slow crack growth in linear polyethylene homopolymers", Journal of Material Science, vol. 23, No. 10, Oct. 1, 1988 (Oct. 1, 1988), pp. 3648-3655.
Strate G Ver et al: "Ethylene-Propylene Copolymers: Degree of Crystallinity and Composition", Journal of Polymer Science: Part A-2, vol. 9, Jan. 1, 1971 (Jan. 1, 1971), pp. 127-141.

\* cited by examiner

*Primary Examiner* — Caixia Lu
(74) *Attorney, Agent, or Firm* — Lerner David LLP

(57) ABSTRACT

The polyethylene according to the present invention has narrow particle size distribution, and can minimize a change in the crystal structure, and thus, it can be reacted with chlorine to prepare chlorinated polyethylene having excellent chlorination productivity and thermal stability.

17 Claims, 2 Drawing Sheets

[FIG. 1]
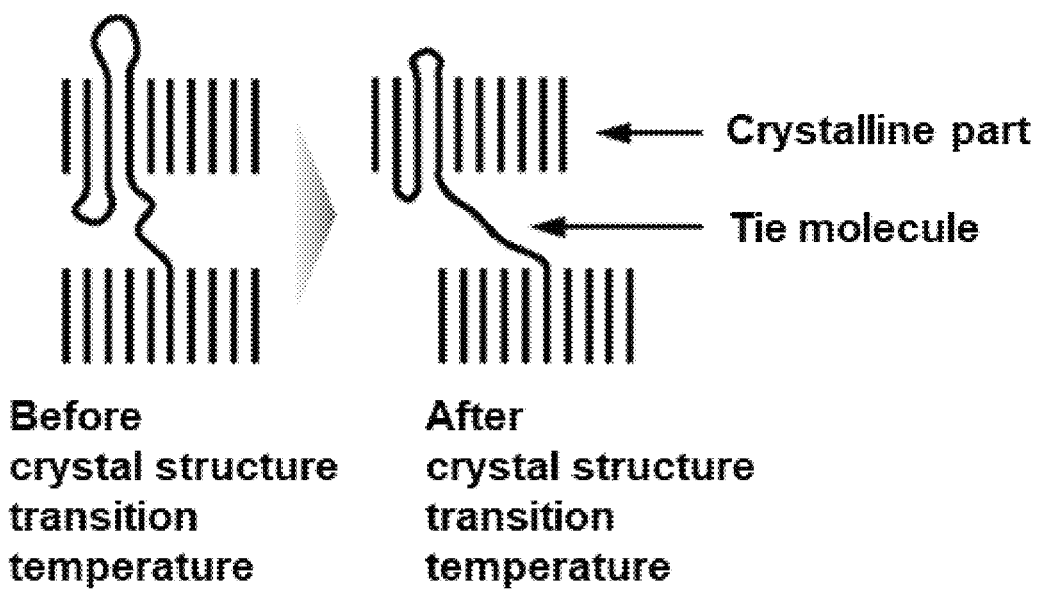

[FIG. 2]
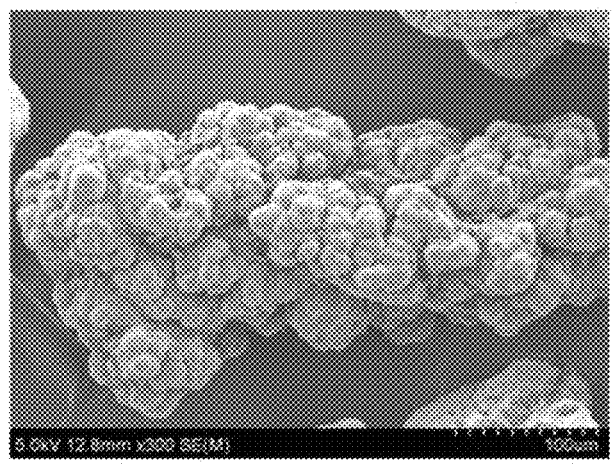
[FIG. 3]
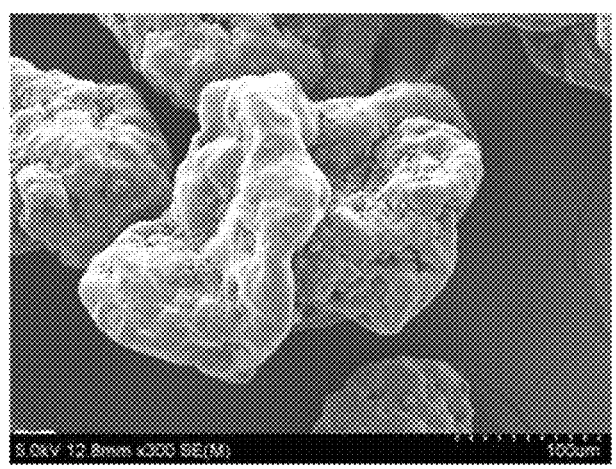

POLYETHYLENE AND CHLORINATED POLYETHYLENE THEREOF

CROSS-REFERENCE TO RELATED APPLICATIONS

This application is a national phase entry under 35 U.S.C. § 371 of International Application No. PCT/KR2019/011171 filed Aug. 30, 2019, which claims priority from Korean Patent Applications No. 10-2018-0102925 filed Aug. 30, 2018, and No. 10-2019-0105962 filed on Aug. 28, 2019, all of which are incorporated herein by reference.

TECHNICAL FIELD

The present invention relates to polyethylene that has narrow particle size distribution and can minimize a change in the crystal structure, and thus, can prepare chlorinated polyethylene having excellent chlorination productivity and thermal stability, and chlorinated polyethylene thereof.

BACKGROUND

Olefin polymerization catalyst system is classified into Zeigler-Natta and metallocene catalyst systems, and these high activity catalyst systems have been developed according to each characteristic. Although a Zeigler-Natta catalyst has been widely applied for the existing commercial processes since it was invented in 1950's, because it is a multi site catalyst having a plurality of active sites, the molecular weight distribution of the prepared polymer is wide, and the composition distribution of comonomers is not uniform, and thus, it has a limitation in securing desired properties.

Meanwhile, a metallocene catalyst consists of a main catalyst including a transition metal compound as a main component and a cocatalyst of an organometal compound including aluminum as a main component, and such a catalyst is a homogeneous complex catalyst and a single site catalyst, and thus, a polymer having narrow molecular weight distribution and uniform composition distribution of comonomers is obtained due to the properties of a single site, and the stereoregularity, copolymerization properties, molecular weight, crystallization degree and the like may be changed by modifying the ligand structure of the catalyst and changing polymerization conditions.

U.S. Pat. No. 5,914,289 describes a method of controlling the molecular weight and the molecular weight distribution of polymer using a metallocene catalyst supported in each carrier. However, a large amount of the catalyst is used for preparing the supported catalyst and the preparation takes long time, and the metallocene catalyst used should be respectively supported in a carrier, which is cumbersome.

Korean Patent Application No. 2003-12308 discloses a method of controlling molecular weight distribution by supporting a dinuclear metallocene catalyst and a mononuclear metallocene catalyst in a carrier together with an activator and polymerizing while changing the combination of the catalysts in a reactor. However, this method has a limit in simultaneous realization of the properties of each catalyst, and has a disadvantage in that metallocene catalyst parts are separated from the carrier component of the finished catalyst to induce fouling of a reactor.

Thus, in order to solve the above disadvantages, there is a continued demand for a method for preparing olefin polymer having desired properties by conveniently preparing a hybrid supported metallocene catalyst having excellent activity.

Meanwhile, it is known that chlorinated polyethylene prepared by reacting polyethylene with chlorine has further improved physical mechanical properties compared to polyethylene, and particularly, since it can withstand severe external environment and chemicals, it is used as PVC impact modifier, flame retardant for ABS, cable sheath, oil hose, and the like.

Chlorinated polyethylene is generally prepared by making polyethylene in the state of a suspension, and then, reacting it with chlorine, or by putting polyethylene in a HCl aqueous solution and reacting it with chlorine, thus substituting hydrogen of polyethylene with chlorine.

In order to sufficiently exhibit the properties of chlorinated polyethylene, polyethylene should be uniformly substituted with chlorine, which is influenced by the properties of polyethylene reacting with chlorine. Particularly, it is influenced by the polymer structure and heat resistance of polyethylene, and if a crystal structure changes a lot according to the polymer structure or heat resistance is lowered, polyethylene particles may be aggregated to increase the entire particle diameter, and the reaction efficiency with chlorine may be lowered, thus rendering uniform chlorine substitution difficult. If such aggregation is generated, it may be difficult for chlorine to penetrate into the center of polyethylene particles, and thus, a time required for achieving desired chlorine substitution degree may increase. Further, if thermal deformation such as morphology change due to surface melting or change in the crystal structure is generated to narrow or block the pores of polyethylene particles, a time required for deacidification, neutralization and washing processes for the removal of chlorine generated as by-products during the chlorination process, or a drying process for the removal of moisture, and the like, increases, thus deteriorating chlorination productivity.

Under these circumstances, it is further required to develop polyethylene with balanced properties and processability so as to secure excellent chlorination productivity and thermal stability.

DETAILED DESCRIPTION OF THE INVENTION

Technical Problem

It is an object of the present invention to provide polyethylene that has narrow particle size distribution and minimizes a change in the crystal structure, and thus, can prepare chlorinated polyethylene having excellent chlorination productivity and thermal stability.

Technical Solution

According to one embodiment of the invention, polyethylene having molecular weight distribution (Mw/Mn) of 2 to 10, tie molecule fraction of 3% or more, crystal structure transition temperature of 108° C. or more, and endothermic initiation temperature of 125° C. or more, is provided.

The present invention also provides chlorinated polyethylene prepared by reacting the polyethylene with chlorine.

Advantageous Effects

Polyethylene according to the present invention has narrow particle size distribution and minimizes a change in the crystal structure, and thus, it can be reacted with chlorine to prepare chlorinated polyethylene having excellent chlorination productivity and thermal stability.

BRIEF DESCRIPTION OF THE DRAWINGS

FIG. 1 is a mimetic diagram showing change in polyethylene crystal arrangement before and after crystal structure transition temperature in the present invention.

FIG. 2 is an SEM photograph of the surface after completing a chlorination process using the polyethylene of Example 1 according to one embodiment of the invention.

FIG. 3 is an SEM photograph of the surface after completing a chlorination process using the polyethylene of Comparative Example 1 having inferior chlorination productivity.

DETAILED DESCRIPTION OF THE EMBODIMENTS

As used herein, terms "a first", "a second" and the like are used to explain various constructional elements, and they are used only to distinguish one constructional element from other constructional elements.

Further, the terms used herein are only to explain specific embodiments, and are not intended to limit the present invention. A singular expression includes a plural expression thereof, unless it is expressly stated or obvious from the context that such is not intended. As used herein, the terms "comprise" or "have", etc. are intended to designate the existence of practiced characteristic, number, step, constructional element or combinations thereof, and they are not intended to preclude the possibility of existence or addition of one or more other characteristics, numbers, steps, constructional elements or combinations thereof.

Although various modifications can be made to the present invention and the present invention may have various forms, specific examples will be illustrated and explained in detail below. However, it should be understood that these are not intended to limit the present invention to specific disclosure, and that the present invention includes all the modifications, equivalents or replacements thereof without departing from the spirit and technical scope of the invention.

Hereinafter, the present invention will be explained in detail.

According to one embodiment of the invention, polyethylene that has narrow particle size distribution and minimizes change in the crystal structure of the initial stage of a chlorination reaction, and thus, can prepare chlorinated polyethylene having excellent chlorination productivity and thermal stability, is provided.

The polyethylene according to the present invention may be ethylene homopolymer that does not comprise comonomers.

The polyethylene has molecular weight distribution (Mw/Mn) of 2 to 10, tie molecule fraction of 3% or more, crystal structure transition temperature of 108° C. or more, and endothermic initiation temperature of 125° C. or more.

In general, chlorinated polyethylene is prepared by reacting polyethylene with chlorine, and it means polyethylene in which a part of hydrogen is substituted with chlorine. If hydrogen of polyethylene is substituted with chlorine, the properties of polyethylene change due to different atomic volumes of hydrogen and chlorine, and for example, since the crystal structure of polyethylene decreases, rigidity decreases and impact strength increases more. Particularly, as the entire size of chlorinated polyethylene particles is smaller and more uniform, chlorine more easily penetrates into the center of polyethylene particles, and thus, a chlorination substitution degree in the particles becomes uniform, thus exhibiting excellent properties. However, if a crystal structure decreases, the melting temperature of polyethylene may decrease, the surface structure of polyethylene particles may change during the chlorination reaction, or particles may be adhered to each other, and thus, the entire size of particles may increase.

The polyethylene according to the present invention has narrow molecular weight distribution, and minimizes change in the polyethylene crystal structure of the initial stage of a chlorination reaction, and thus, can provide chlorinated polyethylene having more excellent chlorination productivity and thermal stability.

The polyethylene according to the present invention has molecular weight distribution of about 2 to about 10, or about 2 to about 7, or about 3 to about 7, or about 3.4 to about 6.9, or about 3.4 to about 4.5. It means that the molecular weight distribution of polyethylene is narrow. If molecular weight distribution is wide, since molecular weight difference between polyethylene is large, chlorine content between polyethylene after a chlorination reaction may become different, and thus, it may be difficult for chlorine to be uniformly distributed. Further, if low molecular weight components are molten, due to high flowability, they may block the pores of polyethylene particles, thus deteriorating chlorination productivity. However, since the present invention has the above explained molecular weight distribution, molecular weight difference between polyethylene after a chlorination reaction is not large, and thus, chlorine may be uniformly distributed.

For example, the molecular weight distribution (Mw/Mn) of polyethylene can be calculated by measuring the weight average molecular weight (Mw) and number average molecular weight (Mn) of polymer using gel permeation chromatography (GPC, manufactured by Agilent Company), and dividing the weight average molecular weight by the number average molecular weight (Mw/Mn).

Specifically, as GPC equipment, Agilent PL-GPC220 may be used, and Polymer Laboratories PLgel MIX-B 300 mm length column may be used. Here, the measurement temperature may be 160° C., 1,2,4-trichlorobenzene may be used as a solvent, and the flow rate may be set to 1 mL/min. A polyethylene sample may be pretreated by dissolving in 1,2,4-trichlorobenzene containing 0.0125% BHT at 160° C. for 10 hours, and prepared at the concentration of 10 mg/10 mL, and then, fed in the amount of 200 μL to measure using GPC analysis instrument (PL-GP220). Using a calibration curve formed using a polystyrene standard specimen, Mw and Mn can be derived. Here, as the polystyrene standard specimen, 9 kinds having weight average molecular weight of 2000 g/mol, 10000 g/mol, 30000 g/mol, 70000 g/mol, 200000 g/mol, 700000 g/mol, 2000000 g/mol, 4000000 g/mol, 10000000 g/mol may be used.

The polyethylene may have weight average molecular weight of about 50000 g/mol to about 250000 g/mol, or about 100000 g/mol to about 250000 g/mol, or about 160000 g/mol to about 250000 g/mol, or about 161000 g/mol to about 250000 g/mol, or about 163000 g/mol to about 250000 g/mol, or about 201000 g/mol to about 250000 g/mol. It means that the molecular weight of polyethylene is high and the content of high molecular weight components is high, which causes increase in tie molecule fraction as described below.

Further, the polyethylene according to the present invention is characterized in that a tie molecule fraction is increased and a crystal structure transition temperature is increased, so as to achieve the above explained narrow particle size distribution and minimize a change in the crystal structure.

The 'tie molecule' means a molecule connecting between one lamellar crystal and another lamellar crystal in polyethylene. More specifically, the polyethylene is semi-crystalline polymer in the form of spherulite that is formed by three-dimensional assembly of plural lamellae formed by bundling of folded polymer chains, and consists of crystalline parts and amorphous parts. Here, the crystalline part means the inside of lamellar crystal, and the amorphous part means the outside of lamellar crystal. Further, the amorphous part consists of i) cilia starting at the crystalline part and ending at the amorphous part, ii) a loose loop connecting one lamellar crystal, and iii) an inter-lamellar link connecting between two lamellar crystals, and among the inter-lamellar link, one molecule connecting between two lamellar crystals is called as a tie molecule.

Thus, the polyethylene comprises a tie molecule connecting between one lamellar crystal and another lamellar crystal in the amorphous part. As the content of the tie molecule is higher, bonding of the crystalline parts increases, a change in the crystal structure decreases, and the properties of the entire polymer can be improved.

Accordingly, the present invention provides polyethylene that has narrow molecular weight distribution, and simultaneously, has increased fraction of tie molecules connecting lamellar crystal structures in the polyethylene, so as to minimize a change in the crystal structure of polyethylene. Specifically, in case the tie molecule fraction increases, crystalline parts may be thoroughly bonded, and thus, a change in the properties of polyethylene, particularly, a change in the crystal structure of the initial stage of the chlorination reaction can be inhibited.

In this respect, the polyethylene according to the present invention has tie molecule fraction of about 3% or more. If the polyethylene has tie molecule fraction less than 3%, a change in the crystal structure may be generated during the chlorination reaction, and thus, the pores of the particle surface may be blocked or a morphology may change. Specifically, the tie molecule fraction may be about 3.1% or more, or about 3.2% or more, or about 3.3% or more, or about 3.4% or more, or about 3.5% or more. However, in order to prevent lowering of the crystallinity and melting temperature of polyethylene, the tie molecule fraction of polyethylene may be about 6.0% or less, or about 5.9% or less, or about 5.8% or less, or about 5.7% or less, or about 5.3% or less, or about 5.0% or less, or about 4.5% or less, or about 4.0% or less, or about 3.8% or less. For example, if the tie molecule fraction is greater than 6.0%, although bonding of crystalline parts may increase, crystallinity and melting temperature may decrease, and thus, pores of the particle surface may be blocked and particles may be aggregated, thus deteriorating chlorination productivity.

Here, the tie molecule fraction of polyethylene can be measured through a tie molecule fraction distribution graph in which the x-axis is log Mw, and the y-axis is nPdM.

The tie molecule fraction distribution graph can be obtained from the data of a GPC curve graph in which the x-axis is log Mw, and the y-axis is dw/d log Mw, and DSC measurement results. Here, Mw means weight-average molecular weight, and w means a weight fraction. Specifically, in the tie molecule fraction distribution graph, the log Mw of the x-axis is identical to the x-axis of the GPC curve graph. Further, in the tie molecule fraction distribution graph, the y-axis of nPdM can be calculated from the data obtained in the GPC curve graph. In the nPdM, n is the number of polymer having molecular weight M and can be calculated as (dw/d log Mw)/M in the GPC curve data, P is the probability of tie molecules being produced and can be calculated by the following Equation 1, and dM is d log Mw<x-axis data of GPC curve, X n+1>−d log Mw<x-axis data of GPC curve. Xn>

$$P = \frac{1}{3} \frac{\int_{2l_c+l_a}^{\infty} r^2 \exp(-b^2 r^2) dr}{\int_0^{\infty} r^2 \exp(-b^2 r^2) dr}$$ [Equation 1]

In the Equation 1,
r is an end-to-end distance of a random coil,
$b^2$ is $3/2<r>^2$,
$l_c$ is a crystal thickness, and
$l_a$ is an amorphous layer thickness.

In the Equation 1, $l_c$ can be calculated from the following Equation 2, wherein Tm is the melting temperature of polyethylene.

$$T_m = T_m^\circ \left(1 - \frac{2\sigma_e}{\Delta h_m l_c}\right)$$ [Equation 2]

In the Equation 2,
$T_m^0$ is 415K, $\sigma_e$ is $60.9\times10^{-3} Jm^{-2}$, $\Delta h_m$ is $2.88\times10^3 Jm^{-3}$.

Further, in the Equation 1, $l_a$ can be calculated from the following Equation 3.

$$l_a = \rho_c l_c (1-\omega^c)/\rho_a \omega^c$$ [Equation 3]

In the Equation 3,
$\rho_c$ is the density of crystalline, and 1000 kg/m³,
$\rho_a$ is the density of amorphous phase, and 852 kg/m³, and
$\omega^c$ is weight fraction crystallinity, and can be measured with DSC.

A tie molecule fraction ($\overline{P}$) can be calculated by the following Equation 4, from the P value calculated from the Equation 1, $$\overline{P} = \frac{\int_0^\infty nPdM}{\int_0^\infty ndM}$$ [Equation 4]

In the Equation 4,
nPdM is as explained in the Equation 1, and
P is a value calculated by the Equation 1.

The polyethylene may have a melting temperature (Tm) of about 130° C. or more, about 130° C. to about 140° C., or about 135° C. or more, or about 135° C. to about 140° C., or about 135.6° C. or more, or about 135.6° C. to about 140° C., or 136° C. or more, or about 136° C. to about 140° C. It means that a temperature at which the crystal structure of polyethylene disappears is high, and thus, it is difficult to generate surface melting during a chlorination process.

In the present invention, the melting temperature (Tm) can be measured using a differential scanning calorimeter (DSC, device name: Q20, manufacturing company: TA Instruments). Specifically, a temperature is increased to 190° C. to heat polyethylene, maintained at that temperature for 5 minutes, decreased to 50° C., and then, increased again, and a temperature corresponding to the top of the DSC (Differential Scanning calorimeter, manufactured by TA Instruments) curve is defined as the melting point (Tm). Here, temperature increase and decrease rates are respectively 10° C./min, and the melting temperature is the result measured in the second temperature increase section.

Further, the polyethylene may have crystallinity of about 55% or more, or about 55.5% or more, or about 55.8% or more, or about 56% or more, or about 56.5% or more, or about 57% or more. It means that the content of the crystal structure of polyethylene is high and dense, and thus, it is difficult for the crystal structure to change during a chlorination process.

Specifically, the crystallinity can be measured using a differential scanning calorimeter (DSC, device name: Q20, manufacturing company: TA Instruments). Specifically, a temperature is increased to 190° C. to heat polyethylene, maintained at that temperature for 5 minutes, decreased to 50° C., and then, increased again, and in the obtained DSC (Differential Scanning calorimeter, manufactured by TA Instruments) analysis result, the area of the melting peak in the second temperature increase section is calculated as heat of fusion ΔHm, which is divided by a theoretical value $H^0m=293.6$ J/g at crystallinity of 100%, thus calculating crystallinity.

Meanwhile, the polyethylene according to the present invention is characterized by increased crystal structure transition temperature as well as increased tie molecule fraction as explained above. The crystal structure transition temperature of the polyethylene may be about 108° C. or more, or about 108.2° C. or more, or about 115° C. or more, or about 120° C. or more, or about 120.5° C. or more, or about 122° C. or more. Further, the crystal structure transition temperature of the polyethylene may be about 132° C. or less, or about 130° C. or less, or about 128° C. or less.

Here, the crystal structure transition temperature means a temperature at which crystal arrangement changes while a lamellar structure constituting crystal is maintained. Specifically, the crystal structure transition temperature can be measured using a dynamic mechanical analyzer (DMA, device name: Q800, manufacturing company: TA Instruments). For example, using a dynamic mechanical analyzer (DMA), a temperature is decreased to −60° C., maintained at that temperature for 5 minutes, and then, increased to 140° C., and the top of the tan δ curve is measured as the crystal structure transition temperature. Specifically, as shown in FIG. 1, polyethylene crystal arrangement changes before and after the crystal structure transition temperature. Thus, the crystal structure transition temperature of the polyethylene of the present invention is 108° C. or more, which is close to a melting temperature, meaning that a change in crystal arrangement occurs at higher temperature, and thus, it is difficult for the morphology of polyethylene particles to change during a chlorination process.

Further, the polyethylene may have endothermic initiation temperature of about 125° C. or more, or about 125° C. to about 134° C., or about 126° C. or more, or about 126° C. to about 132° C., or about 126.3° C. or more, or about 126.3° C. to about 132° C., or about 126.5° C. or more, or about 126.5° C. to about 130° C., or about 126.8° C. or more, or about 126.8° C. to about 130° C. Here, the endothermic initiation temperature of the polyethylene is a temperature at which polymer folding constituting lamellar begins to be unfolded, and is measured as a temperature at which the onset of a melting temperature peak occurs in DSC analysis result. Such endothermic initiation temperature represents a temperature at which melting begins to occur, and the endothermic initiation temperature of the polyethylene of the present invention is 125° C. or more, which is close to a melting temperature, meaning that melting occurs at higher temperature, and thus, it is difficult for surface melting to be generated during a chlorination process. Further, the endothermic initiation temperature of the polyethylene may be about 134° C. or less, or about 132° C. or less, or about 130° C. or less.

Specifically, the endothermic initiation temperature can be measured using a differential scanning calorimeter (DSC, device name: Q20, manufacturing company: TA Instruments). Specifically, a temperature is increased to 190° C. to heat polyethylene, maintained at that temperature for 5 minutes, decreased to 50° C., and then, increased again, and in the obtained DSC analysis result, a temperature at which the onset of a melting peak occurs in the second temperature increase section is defined as the endothermic initiation temperature.

Preferably, the density of the polyethylene may be about 0.940 g/cm³ or more, or about 0.940 g/cm³ to about 0.960 g/cm³, or about 0.945 g/cm³ or more, or about 0.945 g/cm³ to about 0.960 g/cm³, or about 0.951 g/cm³ or more, or about 0.951 g/cm³ to about 0.960 g/cm³. It means that the content of the crystal structure of the polyethylene is high and dense, and thus, it is difficult for the crystal structure to change during a chlorination process. Specifically, the density can be measured by the method of ASTM (American Society for Testing Materials) D 1505.

Preferably, the melt index (MI) of the polyethylene, namely, melt index measured under temperature of 230° C. and load of 5 kg according to the method of ASTM (American Society for Testing Materials) D 1238, may be about 0.1 g/10 min to about 10 g/10 min, or about 0.1 g/10 min to about 5 g/10 min, or about 0.1 g/10 min to about 2 g/10 min, or about 0.1 g/10 min to about 0.95 g/10 min. It means that the molecular weight of the polyethylene is high and the content of high molecular weight components is high, which increases the above explained tie molecule fraction.

The polyethylene according to the present invention may be prepared by polymerizing ethylene in the presence of a metallocene catalyst comprising one or more selected from the group consisting of compounds represented by the following Chemical Formulas 1 to 4:

$$(Cp^1R^a)_n(Cp^2R^b)M^1Z^1_{3-n}$$ <span style="float:right">[Chemical Formula 1]</span> in the Chemical Formula 1, $M^1$ is Group 4 transition metal;

$Cp^1$ and $Cp^2$ are identical to or different from each other, and are each independently one selected from the group consisting of cyclopentadienyl, indenyl, 4,5,6,7-tetrahydro-1-indenyl, and fluorenyl radicals, which may be substituted with hydrocarbon having a carbon number of 1 to 20;

$R^a$ and $R^b$ are identical to or different from each other, and are each independently hydrogen, $C_{1-20}$ alkyl, $C_{1-10}$ alkoxy, $C_{2-20}$ alkoxyalkyl, $C_{6-20}$ aryl, $C_{6-10}$ aryloxy, $C_{2-20}$ alkenyl, $C_{7-40}$ alkylaryl, $C_{7-40}$ arylalkyl, $C_{8-40}$ arylalkenyl, or $C_{2-10}$ alkynyl;

$Z^1$ is a halogen atom, $C_{1-20}$ alkyl, $C_{2-10}$ alkenyl, $C_{7-40}$ alkylaryl, $C_{7-40}$ arylalkyl, $C_{6-20}$ aryl, substituted or unsubstituted $C_{1-20}$ alkylidene, or substituted or unsubstituted amino, $C_{2-20}$ alkylalkoxy, or $C_{7-40}$ arylalkoxy;

n is 1 or 0;

$$(Cp^3R^c)_mB^1(Cp^4R^d)M^2Z^2_{3-m}$$ <span style="float:right">[Chemical Formula 2]</span> in the Chemical Formula 2, $M^2$ is Group 4 transition metal;

$Cp^3$ and $Cp^4$ are identical to or different from each other, and are each independently one selected from the group consisting of cyclopentadienyl, indenyl, 4,5,6,7-tetrahydro-1-indenyl and fluorenyl radicals, which may be substituted with hydrocarbon having a carbon number of 1 to 20;

$R^c$ and $R^d$ are identical to or different from each other, and are each independently hydrogen, $C_{1-20}$ alkyl, $C_{1-10}$ alkoxy, $C_{2-20}$ alkoxyalkyl, $C_{6-20}$ aryl, $C_{6-10}$ aryloxy, $C_{2-20}$ alkenyl, $C_{7-40}$ alkylaryl, $C_{7-40}$ arylalkyl, $C_{8-40}$ arylalkenyl, or $C_{2-10}$ alkynyl;

$Z^2$ is a halogen atom, $C_{1-20}$ alkyl, $C_{2-10}$ alkenyl, $C_{7-40}$ alkylaryl, $C_{7-40}$ arylalkyl, $C_{6-20}$ aryl, substituted or unsubstituted $C_{1-20}$ alkylidene, or substituted or unsubstituted amino, $C_{2-20}$ alkylalkoxy, or $C_{7-40}$ arylalkoxy;

$B^1$ is carbon, germanium, silicon, phosphorus or nitrogen-containing radicals, or a combination thereof, which crosslinks a $Cp^3R^c$ ring with a $Cp^4R^d$ ring, or crosslinks one $Cp^4R^d$ ring to $M^2$;

m is 1 or 0;

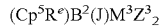

$(Cp^5R^e)B^2(J)M^3Z^3{}_2$            [Chemical Formula 3]

in the Chemical Formula 3, $M^3$ is Group 4 transition metal;

$Cp^5$ is one selected from the group consisting of cyclopentadienyl, indenyl, 4,5,6,7-tetrahydro-1-indenyl and fluorenyl radicals, which may be substituted with hydrocarbon having a carbon number of 1 to 20;

$R^e$ is hydrogen, $C_{1-20}$ alkyl, $C_{1-10}$ alkoxy, $C_{2-20}$ alkoxyalkyl, $C_{6-20}$ aryl, $C_{6-10}$ aryloxy, $C_{2-20}$ alkenyl, $C_{7-40}$ alkylaryl, $C_{7-40}$ arylalkyl, $C_{8-40}$ arylalkenyl, or $C_{2-10}$ alkynyl;

$Z^3$ is a halogen atom, $C_{1-20}$ alkyl, $C_{2-10}$ alkenyl, $C_{7-40}$ alkylaryl, $C_{7-40}$ arylalkyl, $C_{6-20}$ aryl, substituted or unsubstituted $C_{1-20}$ alkylidene, substituted or unsubstituted amino, $C_{2-20}$ alkylalkoxy, or $C_{7-40}$ arylalkoxy;

$B^2$ is carbon, germanium, silicon, phosphorus or nitrogen-containing radicals or a combination thereof, which crosslinks a $Cp^5R^e$ ring with J; and J is one selected from the group consisting of $NR^f$, O, $PR^f$ and S, wherein $R^f$ is $C_{1-20}$ alkyl, aryl, substituted alkyl, or substituted aryl.

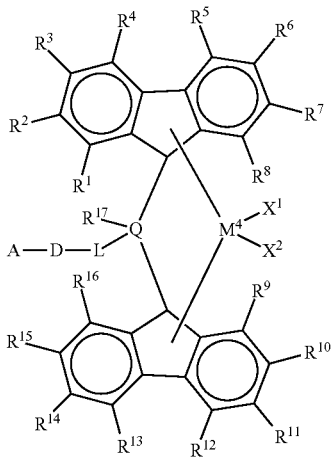

[Chemical Formula 4]

in the Chemical Formula 4, $R^1$ to $R^{17}$ are identical to or different from each other, and each independently, hydrogen, halogen, $C_{1-20}$ alkyl, $C_{2-20}$ alkenyl, $C_{6-20}$ aryl, $C_{7-20}$ alkylaryl, or $C_{7-20}$ arylalkyl;

L is $C_{1-10}$ linear or branched alkylene;

D is —O—, —S—, —N(R)— or —Si(R)(R□)–, wherein R and R□ are identical to or different from each other, and each independently, hydrogen, halogen, $C_{1-20}$ alkyl, $C_{2-20}$ alkenyl, or $C_{6-20}$ aryl;

A is hydrogen, halogen, $C_{1-20}$ alkyl, $C_{2-20}$ alkenyl, $C_{6-20}$ aryl, $C_{7-20}$ alkylaryl, $C_{7-20}$ arylalkyl, $C_{1-20}$ alkoxy, $C_{2-20}$ alkoxyalkyl, $C_{2-20}$ heterocycloalkyl, or $C_{5-20}$ heteroaryl;

Q is carbon, silicon or germanium;

$M^4$ is Group 4 transition metal;

$X^1$ and $X^2$ are identical to or different from each other, and each independently, halogen, $C_{1-20}$ alkyl, $C_{2-20}$ alkenyl, $C_{6-20}$ aryl, nitro, amido, $C_{1-20}$ alkylsilyl, $C_{1-20}$ alkoxy, or $C_{1-20}$ sulfonate.

Hereinafter, the above substituents will be explained in more detail.

The $C_{1-20}$ alkyl includes linear or branched alkyl, and specifically, may include methyl, ethyl, propyl, isopropyl, n-butyl, tert-butyl, pentyl, hexyl, heptyl, octyl, and the like, but is not limited thereto.

The $C_{2-20}$ alkenyl includes linear or branched alkenyl, and specifically, may include allyl, ethenyl, propenyl, butenyl, pentenyl, and the like, but is not limited thereto.

The $C_{6-20}$ aryl includes monocyclic aryl or aryl of condensed ring, and specifically, may include phenyl, biphenyl, naphthyl, phenanthrenyl, fluorenyl, and the like, but is not limited thereto.

The $C_{5-20}$ heteroaryl includes monocyclic heteroaryl or heteroaryl of condensed ring, and specifically, carbazolyl, pyridyl, quinoline, isoquinoline, thiophenyl, furanyl, imidazole, oxazolyl, thiazolyl, triazine, tetrahydropyranyl, tetrahydrofuranyl, and the like, but is not limited thereto.

The $C_{1-20}$ alkoxy includes methoxy, ethoxy, isopropoxy, n-butoxy, tert-butoxy, cyclohexyloxy, and the like, but is not limited thereto.

The $C_{6-10}$ aryloxy includes phenoxy, biphenoxy, naphthoxy, and the like, but is not limited thereto.

Halogen may include fluorine (F), chlorine (Cl), bromine (Br), iodine (I), and the like, but is not limited thereto.

The Group 4 transition metal may include titanium (Ti), zirconium (Zr), hafnium (Hf), and the like, but is not limited thereto.

The above substituents may be optionally substituted with one or more substituents selected from the group consisting of hydroxy; halogen; alkyl, alkenyl, aryl, alkoxy; alkyl, alkenyl, aryl, alkoxy including one or more heteroatoms selected from Group 14 to Group 16 heteroatoms; silyl; alkylsilyl or alkoxysilyl; phosphine; phosphide; sulfonate; and sulfone, in the range within which the effects equal or similar to the aimed effects are obtained.

As the metallocene catalyst for conducting ethylene polymerization of the present invention, those comprising one or more selected from the group consisting of compounds represented by the Chemical Formulas 1 to 4 as catalyst precursors may be used.

Specifically, in the Chemical Formula 1, $M^1$ may be zirconium (Zr) or hafnium (Hf), preferably zirconium (Zr). Further, each of $Cp^1$ and $Cp^2$ may be cyclopentadienyl, indenyl, or fluorenyl. Further, each of $R^a$ and $R^b$ may be hydrogen, $C_{1-6}$ alkyl, $C_{7-12}$ arylalkyl, $C_{2-12}$ alkoxyalkyl, $C_{6-12}$ aryl, or $C_{2-6}$ alkenyl, preferably, hydrogen, methyl, ethyl, propyl, isopropyl, n-butyl, tert-butyl, pentyl, hexyl, butenyl, phenyl, methyl substituted with phenyl, butyl substituted with phenyl, or tert-butoxyhexyl. Further, each of $Z^1$ may be a halogen atom, preferably, chlorine (Cl). Further, n may be 1.

Examples of the compound represented by the Chemical Formula 1 may include compounds represented one of the following Structural Formulas, but are not limited thereto.

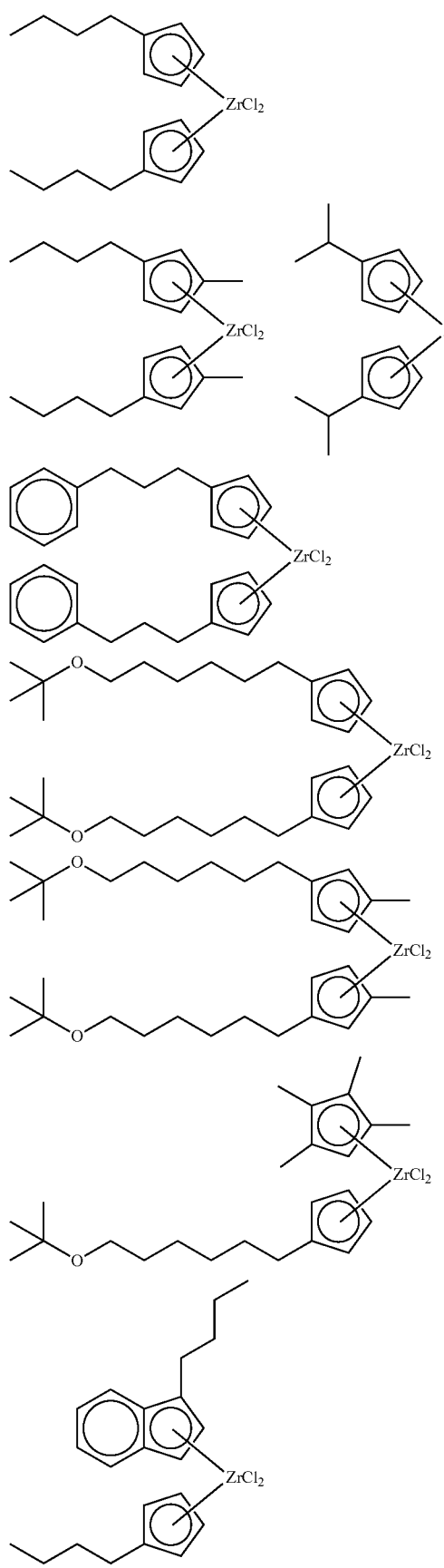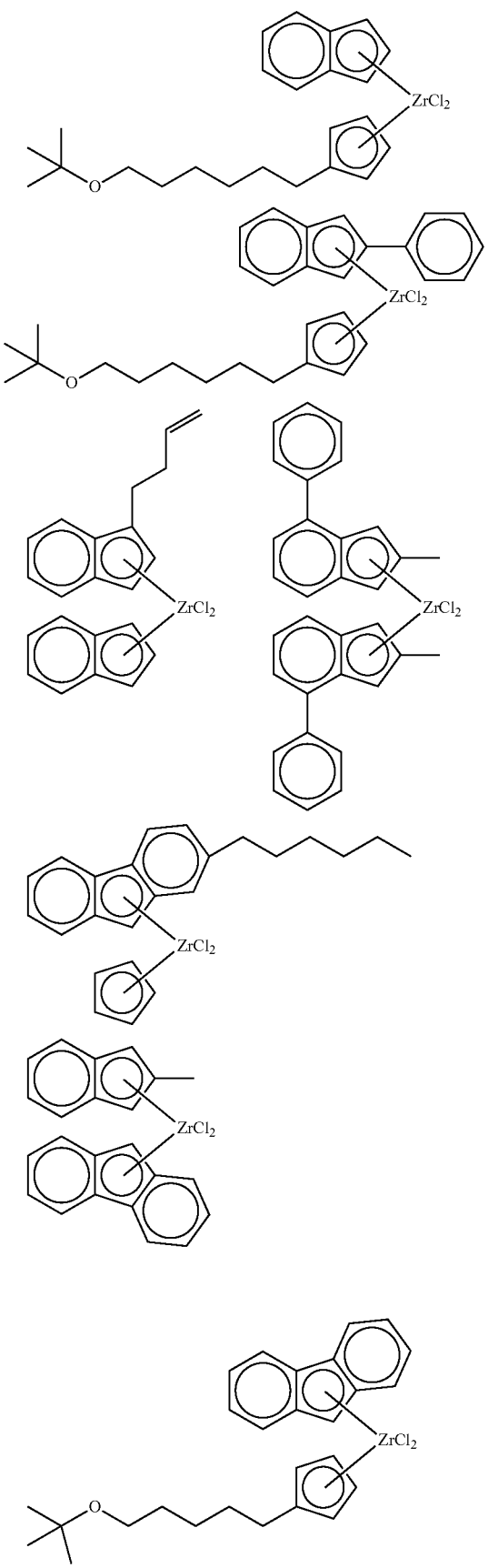

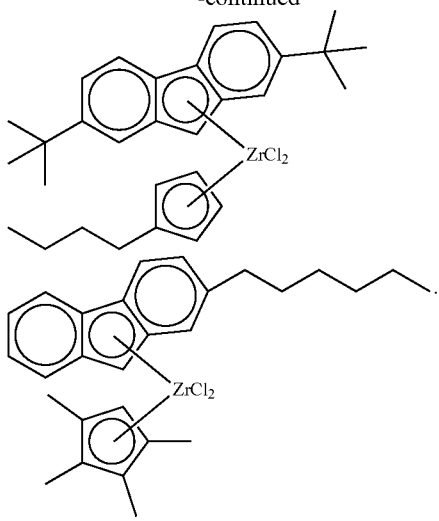

In the above Structural Formulas, ph denotes a phenyl group.

Meanwhile, the Chemical Formula 2 wherein m is 1 means the structure of a bridged compound wherein the $Cp^3R^c$ ring and the $Cp^4R^d$ ring, or the $Cp^4R^d$ ring and $M^2$ are crosslinked by $B^1$, and the Chemical Formula 2 wherein m is 0 means the structure of a non-crosslinked compound.

Specifically, in the Chemical Formula 2, $M^2$ may be zirconium (Zr) or hafnium (Hf), preferably zirconium (Zr). Further, $B^1$ may be a radical comprising carbon (C), germanium (Ge), or silicon (Si), preferably a radical comprising carbon (C) or silicon (Si), wherein the carbon (C) or silicon (Si) may be substituted with one or more selected from $C_{1-6}$ alkyl and $C_{2-12}$ alkoxyalkyl. More specifically, $B^1$ may be dimethylsilyl, diethylsilyl, methyl (tert-butoxyhexyl)silyl, dimethylmethylene, or cyclohexylene. Further, each of $Cp^3$ and $Cp^4$ may be cyclopentadienyl, indenyl, or fluorenyl. Further, each of $R^c$ and $R^d$ may be hydrogen, $C_{1-6}$ alkyl, $C_{7-12}$ arylalkyl, $C_{2-12}$ alkoxyalkyl, $C_{6-12}$ aryl, or $C_{2-6}$ alkenyl, preferably hydrogen, methyl, ethyl, propyl, isopropyl, n-butyl, tert-butyl, pentyl, hexyl, butenyl, phenyl, methyl substituted with phenyl, butyl substituted with phenyl, or tert-butoxyhexyl. Further, each of $Z^2$ may be a halogen atom, preferably chlorine (Cl). Further, m may be 1.

Examples of the compounds represented by the Chemical Formula 2 may include compounds represented by one of the following Structural Formulas, but are not limited thereto.

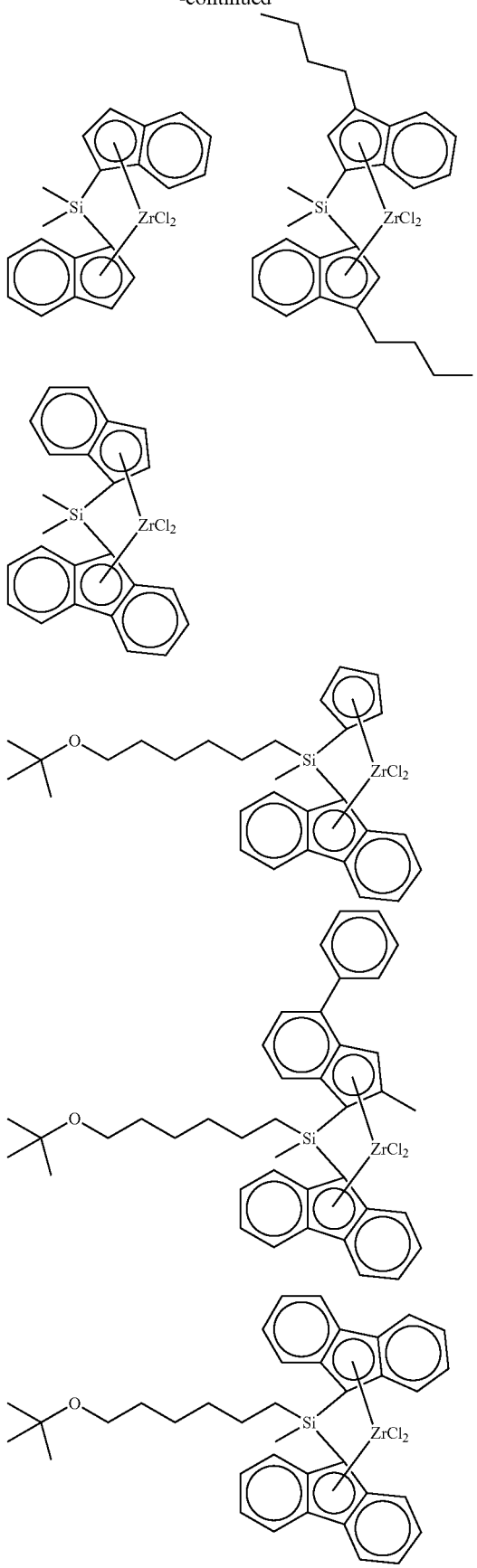

-continued

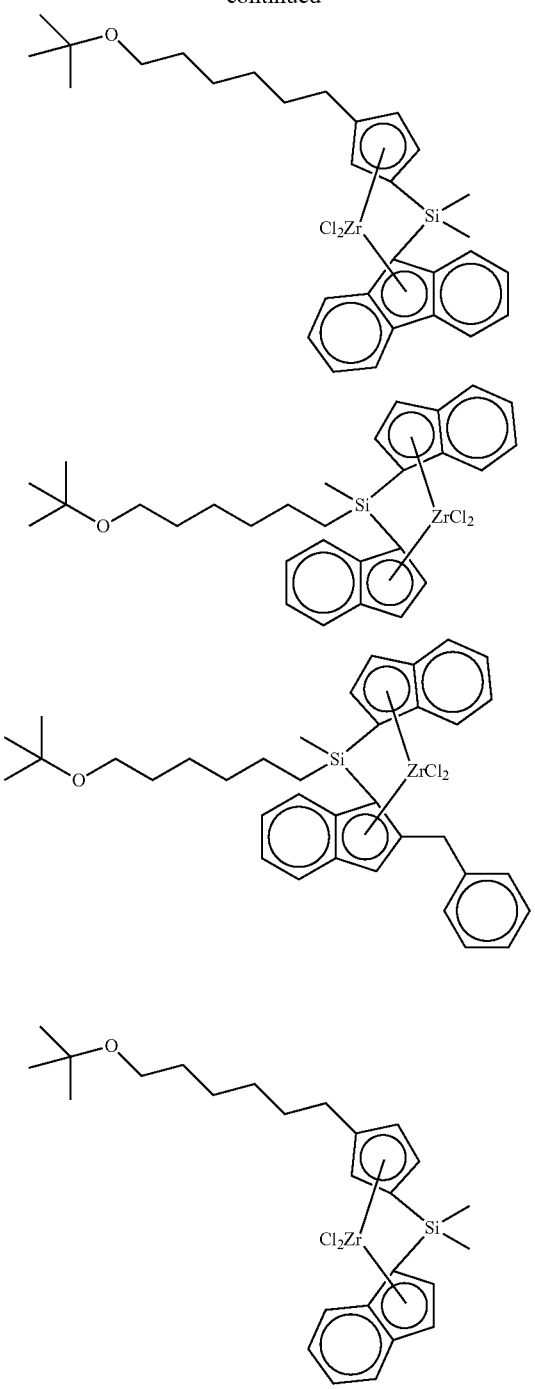

-continued

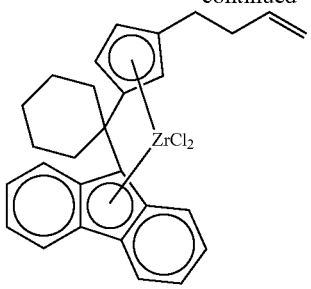

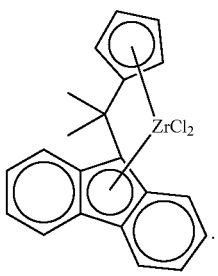

In the above Structural Formulas, ph denotes a phenyl group.

Specifically, in the Chemical Formula 3, $M^3$ may be titanium (Ti). Further, $B^2$ may be a radical comprising carbon (C), germanium (Ge), or silicon (Si), preferably a radical comprising carbon (C) or silicon (Si), wherein the carbon (C) or silicon (Si) may be substituted with one or more selected from $C_{1-6}$ alkyl and $C_{2-12}$ alkoxyalkyl. More specifically, $B^2$ may be dimethylsilyl, diethylsilyl, methyl (tert-butoxyhexyl)silyl, dimethylmethylene, or cyclohexylene. Further, J may be $NR^f$, wherein $R^f$ may be $C_{1-6}$ alkyl, $C_{6-12}$ aryl, $C_{2-6}$ alkenyl, or $C_{2-12}$ alkoxyalkyl, preferably, methyl, ethyl, propyl, isopropyl, n-butyl, tert-butyl, butenyl, phenyl, or tert-butoxyhexyl. Further, $Cp^5$ may be cyclopentadienyl, indenyl, or fluorenyl. Further, $R^e$ may be hydrogen, $C_{1-6}$ alkyl, $C_{7-12}$ arylalkyl, $C_{2-12}$ alkoxyalkyl, $C_{6-12}$ aryl, or $C_{2-10}$ alkenyl, preferably hydrogen, methyl, ethyl, propyl, isopropyl, n-butyl, tert-butyl, pentyl, hexyl, butenyl, phenyl, methyl substituted with phenyl, butyl substituted with phenyl, or tert-butoxyhexyl. Further, each of $Z^3$ may be a halogen atom, preferably chlorine (Cl).

Examples of the compounds represented by the Chemical Formula 3 may include compounds represented by one of the following Structural Formulas, but are not limited thereto.

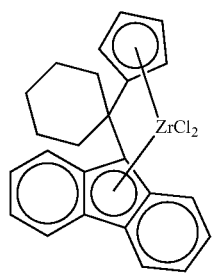

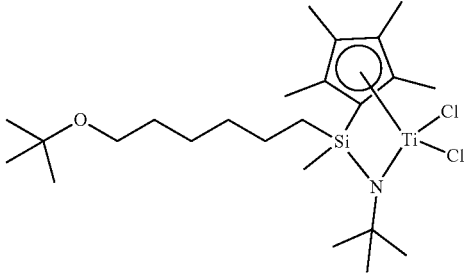

-continued

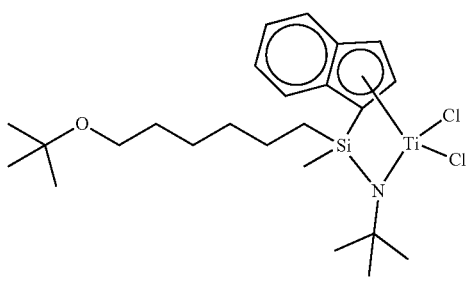

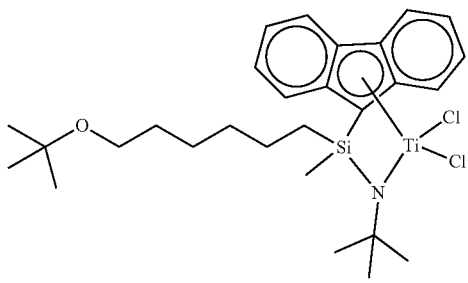

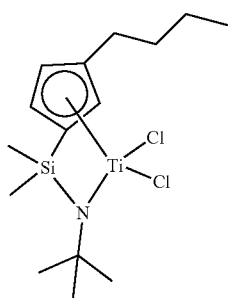

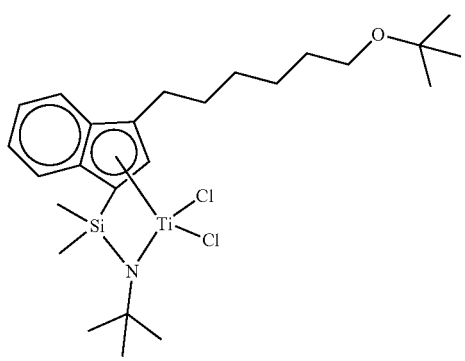

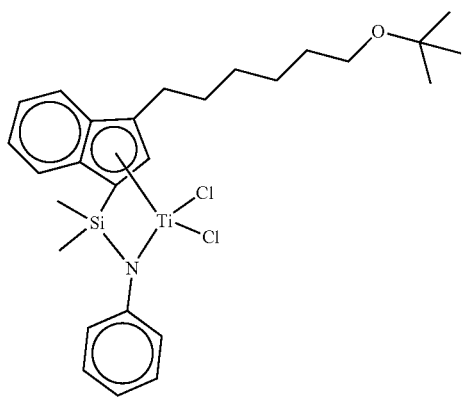

-continued

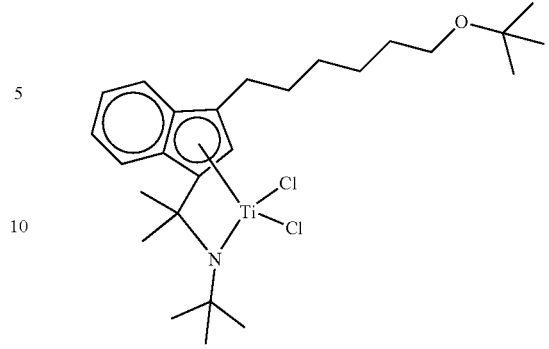

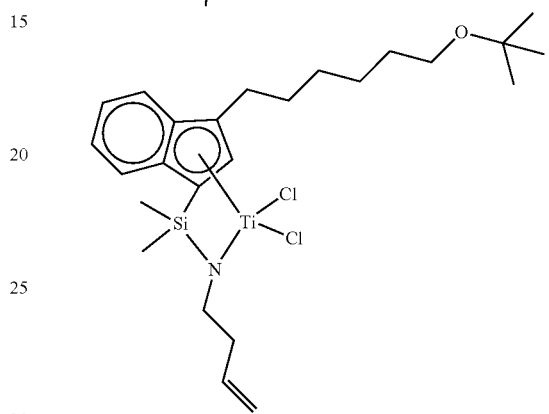

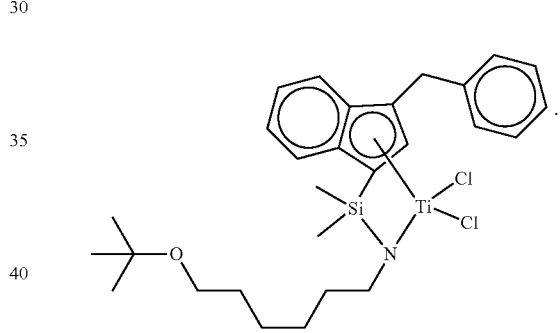

Specifically, in the Chemical Formula 4, $M^4$ may be zirconium (Zr) or hafnium (Hf), preferably zirconium (Zr). Further, Q may be silicon (Si). Further, each of $R^1$ to $R^{17}$ may be hydrogen, $C_{1-8}$ alkyl, $C_{2-8}$ alkenyl, or $C_{6-12}$ aryl, preferably methyl, ethyl, propyl, isopropyl, n-butyl, tert-butyl, pentyl, hexyl, heptyl, ocyl, or phenyl, but is not limited thereto. Further, it is more preferable that L is $C_{4-8}$ linear or branched alkylene, but is not limited thereto. Further, the alkylene group may be unsubstituted or substituted with $C_{1-20}$ alkyl, $C_{2-20}$ alkenyl, or $C_{6-20}$ aryl. Preferably, L may be hexylene. Further, D may be —O—. Further, A may be hydrogen, $C_{1-6}$ alkyl, $C_{1-6}$ alkoxy, $C_{2-12}$ alkoxyalkyl, or $C_{5-12}$ heteroaryl, but is not limited thereto. Preferably, A may be hydrogen, methyl, ethyl, propyl, isopropyl, n-butyl, tert-butyl, methoxymethyl, tert-butoxymethyl, 1-ethoxyethyl, 1-methyl-1-methoxyethyl, tetrahydropyranyl, or tetrahydrofuranyl. Further, each of $X^1$ and $X^2$ may be halogen, preferably chlorine (Cl).

Examples of the compounds represented by the Chemical Formula 4 may include compounds represented by one of the following Structural Formulas, but are not limited thereto.

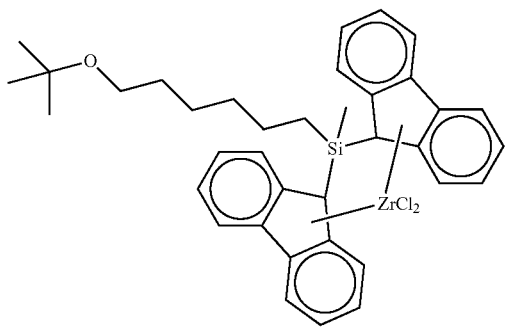

A method for preparing the metallocene compounds will be described in detail in Examples below.

Particularly, the polyethylene according to the present invention may be prepared by polymerizing ethylene in the presence of one or more first metallocene compounds represented by the Chemical Formula 1; and one or more second metallocene compounds selected from the compounds represented by the Chemical Formulas 2 to 4.

For example, the polyethylene may be prepared in the presence of a hybrid supported catalyst in which one or more first metallocene compounds represented by the Chemical Formula 1 and one or more second metallocene compounds represented by the Chemical Formula 2 are supported together, or may be prepared in the presence of a hybrid supported catalyst in which one or more first metallocene compounds represented by the Chemical Formula 1 and one or more second metallocene compounds represented by the Chemical Formula 4 are supported together.

Further, the polyethylene may be prepared in the presence of the above explained metallocene catalyst, while introducing hydrogen gas.

Here, the hydrogen gas may be introduced in the content of about 60 ppm to about 150 ppm, or about 65 ppm to about 135 ppm, based on the weight of ethylene. Specifically, based on the introduction of 15 kg/hr of ethylene, the hydrogen gas may be introduced in the content of about 0.1 g/h to about 0.2 g/hr.

The metallocene catalyst used in the present invention may be supported in a carrier together with a cocatalyst compound.

Further, the supported metallocene catalyst may induce the production of LCB (Long Chain Branch) in the prepared polyethylene.

In the supported metallocene catalyst according to the present invention, the cocatalyst supported together so as to activate the metallocene compound is not specifically limited as long as it is an organometallic compound including Group 13 metal and can be used when polymerizing olefin in the presence of common metallocene catalysts The cocatalyst is not specifically limited as long as it is an organometallic compound including Group 13 metal and can be used when polymerizing ethylene in the presence of common metallocene catalysts Specifically, the cocatalyst may be one or more selected from the group consisting of compounds represented by the following Chemical Formulas 5 to 7:

—[Al($R^{18}$)—O]$_c$—    [Chemical Formula 5]

In the Chemical Formula 5,
$R^{18}$ may be each independently, halogen, $C_{1-20}$ alkyl or $C_{1-20}$ haloalkyl,
c is an integer equal to or greater than 2, D($R^{19}$)$_3$    [Chemical Formula 6]

In the Chemical Formula 6,
D is aluminum or boron,
$R^{19}$ are each independently, hydrogen, halogen, $C_{1-20}$ hydrocarbyl, or $C_{1-20}$ hydrocarbyl substituted with halogen,

[L-H]$^+$[Q(E)$_4$]$^-$ or [L]$^+$[Q(E)$_4$]$^-$    [Chemical Formula 7]

In the Chemical Formula 7,
L is neutral or cationic Lewis base,
[L-H]$^+$ is Bronsted acid,
Q is Br$^{3+}$ or Al$^{3+}$,
E's are each independently, $C_{6-20}$ aryl or $C_{1-20}$ alkyl, wherein the $C_{6-20}$ aryl or $C_{1-20}$ alkyl may be unsubstituted or substituted with one or more substituents selected from the group consisting of halogen, $C_{1-20}$ alkyl, $C_{1-20}$ alkoxy and $C_{6-20}$ aryloxy.

Examples of the compounds represented by the Chemical Formula 5 may include alkylaluminoxane such as modified methylaluminoxane (MMAO), methylalulminoxane (MAO), ethylaluminoxane, isobutylaluminoxane, butylaluminoxane, and the like.

Examples of the alkyl metal compound represented by the Chemical Formula 6 may include trimethylaluminum, triethylaluminum, triisobutylaluminum, tripropylaluminum, tributylaluminum, dimethylchloroaluminum, dimethylisobutylaluminum, dimethylethylaluminum, diethylchloroaluminum, trimethylaluminum, triethylaluminum, triisobutylaluminum, tripropylaluminum, tributylaluminum, dimethylchloroaluminum, ethyldimethylaluminum, methyldiethylaluminum, triphenylaluminum, tri-p-tolylaluminum, dimethylaluminum methoxide, dimethylaluminum ethoxide, trimethylboron, triethylboron, triisobutylboron, tripropylboron, tributylboron, and the like.

Examples of the compound represented by the Chemical Formula 7 may include triethylammonium tetra (phenyl) boron, tributylammonium tetra (phenyl)boron, trimethylammonium tetra (phenyl)boron, tripropylammonium tetra (phenyl)boron, trimethylammonium tetra (p-tolyl) boron, tripropylammoniumtetra (p-tolyl)boron, triethylammoniumtetra (o,p-dimehylphenyl)boron, trimethylammonium tetra (o,p-dimethylphenyl)boron, tributylammonium tetra (p-trifluoromethylphenyl)boron, trimethylammonium tetra (p-trifluoromethylphenyl)boron, tributylammonium tetra (pentafluorophenyl)boron, N,N-diethylanilinium tetra (phenyl)boron, N,N-diethylanilinium tetra (phenyl)boron, N,N-diethylanilinium tetra (pentafluorophenyl)boron, diethylammonium tetra (pentafluorophenyl)boron, triphenylphosphonium tetra (phenyl)boron, trimethylphosphonium tetra (phenyl)boron, triethylammonium tetra (phenyl)aluminum, tributylammonium tetra (phenyl)aluminum, trimethylammonium tetra (phenyl)aluminum, tripropylammonium tetra (phenyl)aluminum, trimethylammonium tetra (p-tolyl) aluminum, tripropylammonium tetra (p-tolyl)aluminum, triethylammonium tetra (o,p-dimethylphenyl)aluminum, tributylammonium tetra (p-trifluoromethylphenyl)aluminum, trimethylammonium tetra (p-trifluoromethylphenyl) aluminum, tributylammonium tetra (pentafluorophenyl)aluminum, N, N-diethylanilinium tetra (phenyl)aluminum, N, N-diethylanilinium tetra (phenyl)aluminum, N, N-diethylanilinium tetra (pentafluorophenyl)aluminum, diethylammonium tetra (pentafluorophenyl)aluminum, triphenylphosphonium tetra (phenyl)aluminum, trimethylphosphonium tetra (phenyl)aluminum, triphenylcarbonium tetraphenylboron, triphenylcarbonium tetraphenylaluminum, triphenylcarbonium tetra (p-trifluoromethylphenyl)boron, triphenylcarbonium tetrapentafluorophenylboron, and the like.

The support amount of the cocatalyst may be 5 mmol to 20 mmol, based on 1 g of the carrier.

In the supported metallocene catalyst according to the present invention, as the carrier, those containing hydroxy groups on the surface may be used, and preferably, carriers having highly reactive hydroxy groups and siloxane groups, which are dried to remove moisture on the surface, may be used.

For example, silica, silica-alumina, and silica-magnesia, and the like, which is dried at high temperature, may be used, and they may commonly contain oxide, carbonate, sulfate, and nitrate components such as $Na_2O$, $K_2CO_3$, $BaSO_4$, and $Mg(NO_3)_2$, and the like.

The drying temperature of the carrier may be preferably 200° C. to 800° C., more preferably 300° C. to 600° C., and most preferably 300° C. to 400° C. If the drying temperature of the carrier is less than 200° C., due to much moisture, a cocatalyst may react with surface moisture, and if it is greater than 800° C., pores of the carrier surface may be coalesced to decrease the surface area, and a lot of surface hydroxyl groups may disappear and only siloxane groups may remain, thus decreasing reaction sites with a cocatalyst.

The amount of hydroxyl groups on the carrier surface may be preferably 0.1 mmol/g to 10 mmol/g, more preferably 0.5 mmol/g to 5 mmol/g. The amount of hydroxyl groups on the carrier surface may be controlled by the preparation method and conditions or drying conditions of the carrier, for example, temperature, time, vacuum or spray drying, and the like.

If the amount of hydroxyl groups is less than 0.1 mmol/g, reaction sites with a cocatalyst may be small, and if it is greater than 10 mmol/g, they may be derived from moisture other than hydroxyl groups existing on the carrier particle surface, which is not preferable.

In the metallocene catalyst according to the present invention, the mass ratio of the transition metal included in the metallocene catalyst to the carrier may be 1:10 to 1:1000. When the carrier and the metallocene catalyst compound are included at the above mass ratio, optimum shape may be exhibited. Further, the mass ratio of the cocatalyst compound to the carrier may be 1:1 to 1:100.

Meanwhile, the chlorinated polyethylene according to the present invention may be prepared by polymerizing ethylene in the presence of the above explained supported metallocene catalyst, and then, reacting it with chlorine.

The ethylene polymerization may be progressed using one continuous type slurry polymerization reactor, loop slurry reactor, gas phase reactor or solution reactor.

Further, the polymerization temperature may be about 25° C. to about 500° C., preferably about 25° C. to about 200° C., more preferably about 50° C. to about 150° C. or about 80° C. to about 150° C. Further, the polymerization pressure may be about 1 kgf/cm² to about 100 kgf/cm², preferably about 1 kgf/cm² to about 50 kgf/cm², more preferably about 5 kgf/cm² to about 30 kgf/cm².

The supported metallocene catalyst may be dissolved or diluted in a C5-12 aliphatic hydrocarbon solvent such as pentane, hexane, heptane, nonane, decane, and isomers thereof, an aromatic hydrocarbon solvent such as toluene, benzene, or a hydrocarbon solvent substituted with a chlorine atom such as dichloromethane, dichlorbenzene, and the like, and introduced. It is preferable that the solvent used may be treated with a small amount of alkyl aluminum to remove a small amount of water or air acting as a catalyst poison, and a cocatalyst may be additionally used.

The reaction with chlorine may be conducted by dispersing the above prepared polyethylene with water, an emulsifying agent and a dispersant, and then, introducing a catalyst and chlorine.

As the emulsifying agent, polyether or polyalkyleneoxide may be used. As the dispersant, a polymer salt or an organic acid polymer salt may be used, and as the organic acid, methacrylic acid or acrylic acid may be used.

As the catalyst, a chlorination catalyst used in the art may be used, and for example, benzoyl peroxide may be used. The chlorine may be used alone, or it may be used in combination with inert gas.

It is preferable that the reaction is conducted at 60° C. to about 150° C. or about 100° C. to about 140° C., and the reaction time is about 10 minutes to about 10 hours, or about 30 minutes to about 8 hours.

The chlorinated polyethylene prepared by the above reaction may be additionally subjected to a neutralization process, a washing process and/or a drying process, and thus, may be obtained in powder form.

Further, a method for preparing a molded product with the chlorinated polyethylene according to the present invention may use a common method in the art. For example, a molded product may be prepared by roll-mill compounding of the chlorinated polyethylene, followed by extrusion processing.

Hereinafter, preferable examples will be presented for better understating of the invention. However, these examples are presented only as the illustrations of the invention, and the present invention is not limited thereby.

EXAMPLES

[Preparation of a Metallocene Compound]

Preparation Example 1: Preparation of [tert-butoxy-$(CH_2)_6$—$C_5H_4$]$_2$$ZrCl_2$] Metallocene Compound t-butyl-O—$(CH_2)_6$—Cl was prepared using 6-chlorohexanol by a method described in the document (Tetrahedron Lett. 2951, 1988), and was reacted with sodium cyclopentadienyl (NaCp) to obtain t-butyl-O—$(CH_2)_6$—$C_5H_5$ (yield 60%, b.p. 80° C./0.1 mmHg).

Further, the t-butyl-O—$(CH_2)_6$—$C_5H_5$ was dissolved in tetrahydrofurane (THF) at −78° C. and n-butyl lithium (n-BuLi) was slowly added thereto, and then, the temperature was raised to a room temperature, and the solution was reacted for 8 hours. The synthesized lithium salt solution was slowly added to a suspension of $ZrCl_4$ $(THF)_2$ (170 g, 4.50 mmol)/THF (30 mL) at −78° C., and the solution was additionally reacted at a room temperature for 6 hours. All the volatiles were removed by vacuum drying, and hexane was added to the obtained oily liquid substance to filter. After vacuum drying the filtered solution, hexane was added to induce precipitation at low temperature (−20° C.). The obtained precipitate was filtered at a room temperature to obtain [tert-butyl-O—$(CH_2)_6$—$C_5N_2ZrCl_2$] in the form of white solid (yield 92%).

$^1$H-NMR (300 MHz, $CDCl_3$): 6.28 (t, J=2.6 Hz, 2H), 6.19 (t, J=2.6 Hz, 2H), 3.31 (t, 6.6 Hz, 2H), 2.62 (t, J=8 Hz), 1.7-1.3 (m, 8H), 1.17 (s, 9H)

$^{13}$C-NMR ($CDCl_3$): 135.09, 116.66, 112.28, 72.42, 61.52, 30.66, 30.31, 30.14, 29.18, 27.58, 26.00

Preparation Example 2: Preparation of [tert-butoxy-$(CH_2)_6$]$(CH_3)Si(C_5(CH_3)_4)$ (tert-butyl-N)$TiCl_2$] Metallocene Compound To a 10 L reactor, 50 g of Mg (s) was added at a room temperature, and then, 300 mL of THF was added. 0.5 g of 12 was added, and then, the temperature of the reactor was maintained at 50° C. After the temperature of the reactor was stabilized, 250 g of 6-t-butoxyhexylchloride was added to the reactor at 5 mL/min using a feeding pump. It was observed that the temperature of the reactor increased by 4° C. to 5° C. as 6-t-butoxyhexylchloride was added. Continuously, while adding 6-t-butoxyhexylchloride, the solution was stirred for 12 hours to obtain a black reaction solution. 2 mL of the produced black solution was taken, and then, water was added to obtain an organic layer, which was confirmed to be 6-t-butoxyhexane through $^1$H-NMR, thus confirming that a Grignard reaction progressed well. Therefrom, 6-(tert-butoxy)hexyl magnesium chloride was synthesized.

500 g of $(CH_3)SiCl_3$ and 1 L of THF were added to a reactor, and the temperature of the reactor was decreased to −20° C. 560 g of the above synthesized 6-t-butoxyhexyl magnesium chloride was added to the reactor at 5 mL/min using a feeding pump. After the feeding of Grignard reagent was finished, the solution was stirred for 12 hours while slowly raising the temperature of the reactor to a room temperature, to produce white $MgCl_2$ salt. 4 L of hexane was added and the salt was removed through labdori to obtain a filtered solution. The obtained filtered solution was added to a reactor, and then, hexane was removed at 70° C. to obtain a pale yellow liquid. The obtained liquid was confirmed to be [methyl (6-t-butoxyhexyl)dichlorosilane] through $^1$H-NMR.

$^1$H-NMR ($CDCl_3$): 3.3 (t, 2H), 1.5 (m, 3H), 1.3 (m, 5H), 1.2 (s, 9H), 1.1 (m, 2H), 0.7 (s, 3H)

1.2 mol (150 g) of tetramethylcyclopentadiene and 2.4 L of THF were added to a reactor, and then, the reactor was cooled to −20° C. 480 mL of n-BuLi was added to the reactor at 5 mL/min using a feeding pump. After adding n-BuLi, the solution was stirred for 12 hours while slowly raising the temperature to a room temperature. Subsequently, an equivalent of methyl (6-t-butoxyhexyl)dichlorosilane (326 g, 350 mL) was quickly added to the reactor. While raising the temperature of the reactor to a room temperature, the solution was stirred for 12 hours, and then, the reactor was cooled to 0° C. again, and then, 2 equivalents of tert-butyl amine (t-BuNH$_2$) were added. While slowly raising the temperature of the reactor to a room temperature, the solution was stirred for 12 hours. Subsequently, THF was removed, 4 L of hexane was added, and the salt was removed through labdori to obtain a filtered solution. After adding the filtered solution to a reactor again, hexane was removed at 70° C. to obtain a yellow solution. It was confirmed to be methyl (6-(tert-butoxy)hexyl) (tetramethylcyclopentadienyl)tert-butylaminosilane through $^1$H-NMR.

A ligand dilithium salt was synthesized at −78° C. from n-BuLi and the ligand dimethyl (tetramethylcyclppentadienyl)tert-butylaminosilane in THF. To the ligand dilithium salt, $TiCl_3$ $(THF)_3$ (10 mmol) was quickly added. The reaction solution was stirred for 12 hours while slowly raising the temperature from −78° C. to a room temperature. Subsequently, an equivalent of $PbCl_2$ (10 mmol) was added to the reaction solution at a room temperature, and the solution was stirred for 12 hours to obtain a bluish black solution. THF was removed in the produced reaction solution, and then, hexane was added to filter the product. Further, hexane was removed from the obtained filtrate, and the product was confirmed to be tert-butoxy-$(CH_2)_6$]($CH_3$)Si($C_5$ ($CH_3$)$_4$) (tert-butyl-N)TiCl$_2$ by $^1$H-NMR.

$^1$H-NMR ($CDCl_3$): 3.3 (s, 4H), 2.2 (s, 6H), 2.1 (s, 6H), 1.8-0.8 (m), 1.4 (s, 9H), 1.2 (s, 9H), 0.7 (s, 3H)

Preparation Example 3: Preparation of [[tert-butoxy-$(CH_2)_6$]($CH_3$)Si (9-$C_{13}F_{19}$)$_2$ZrCl$_2$] Metallocene Compound 1.0 mole of a tert-butyl-O—$(CH_2)_6$MgCl, which is a Grignard reagent, was obtained by the reaction of a tert-butyl-O—$(CH_2)_6$Cl compound and Mg(O) under a THF solvent. The prepared Grignard compound was added to a flask containing −30° C. $(CH_3)SiCl_3$ (176.1 mL, 1.5 mol) and THF (2.0 mL), and the solution was stirred at a room temperature for more than 8 hours, and then, the filtrate was vacuum dried to obtain a compound of tert-butyl-O—$(CH_2)_6$Si($CH_3$)Cl$_2$ (yield 92%).

Fluorene (Flu, 3.33 g, 20 mmol), hexane (100 mL) and MTBE (methyl tert-butyl ether, 1.2 mL, 10 mmol) were put in a reactor at −20° C., and 8 mL of n-BuLi (2.5M in Hexane) was slowly added thereto, and the solution was stirred at a room temperature for 6 hours. After the stirring was completed, the reactor was cooled to −30° C., and the prepared fluorenyl lithium solution was slowly added to the solution of tert-butyl-O—$(CH_2)_6$Si($CH_3$)Cl$_2$ (2.7 g, 10 mmol) dissolved in hexane (100 mL) at −30° C. over 1 hour. After stirring at a room temperature for more than 8 hours, water was added to extract, and the product was dried to obtain a compound of (tert-butyl-O—$(CH_2)_6$)($CH_3$)Si(9-$C_{13}H_{10}$)$_2$ (5.3 g, yield 100%). The structure of the ligand was confirmed through $^1$H-NMR.

$^1$H NMR (500 MHz, $CDCl_3$): −0.35 ($CH_3$Si, 3H, s), 0.26 (Si-$CH_2$, 2H, m), 0.58 ($CH_2$, 2H, m), 0.95 ($CH_2$, 4H, m), 1.17 (tert-butyl-O, 9H, s), 1.29 ($CH_2$, 2H, m), 3.21 (tert-butyl-O—$CH_2$, 2H, t), 4.10 (Flu-9H, 2H, s), 7.25 (Flu-H, 4H, m), 7.35 (Flu-H, 4H, m), 7.40 (Flu-H, 4H, m), 7.85 (Flu-H, 4H, d).

4.8 mL of n-BuLi (2.5M in Hexane) was slowly added to the solution of (tert-butyl-O—$(CH_2)_6$)($CH_3$)Si(9-$C_{13}H_{10}$)$_2$ (3.18 g, 6 mmol)/MTBE (20 mL) at −20° C., and reacted for more than 8 hours while raising the temperature to a room temperature, and then, the above prepared slurry solution of dilithium salt was slowly added to the slurry solution of $ZrCl_4$ (THF)$_2$ (2.26 g, 6 mmol)/hexane (20 mL) at −20° C. and additionally reacted at a room temperature for 8 hours. The precipitate was filtered and washed with hexane several times to obtain a compound of (tert-butyl-O—$(CH_2)_6$)($CH_3$)Si(9-$C_{13}H_9$)$_2$ZrCl$_2$ in the form of red solid (4.3 g, yield 94.5%).

$^1$H NMR (500 MHz, $C_6D_6$): 1.15 (tert-butyl-O, 9H, s), 1.26 ($CH_3$Si, 3H, s), 1.58 (Si-$CH_2$, 2H, m), 1.66 ($CH_2$, 4H, m), 1.91 ($CH_2$, 4H, m), 3.32 (tert-butyl-O—$CH_2$, 2H, t), 6.86 (Flu-H, 2H, t), 6.90 (Flu-H, 2H, t), 7.15 (Flu-H, 4H, m), 7.60 (Flu-H, 4H, dd), 7.64 (Flu-H, 2H, d), 7.77 (Flu-H, 2H, d)

[Preparation of a Supported Catalyst]

Preparation Example 4: Preparation of a Supported Catalyst

Into a high pressure reactor made of stainless steel (sus) with a capacity of 20 L, 5.0 kg of a toluene solution was put, and the temperature of the reactor was maintained at 40° C. 1000 g of silica (manufactured by Grace Davison Company, SP2212) dehydrated by applying vacuum at 600° C. for 12 hours was introduced into the reactor, the silica was sufficiently dispersed, and then, 80 g of the metallocene compound of Preparation Example 1 dissolved in toluene was introduced, and the reaction solution was stirred at 40° C. at 200 rpm for 2 hours to react. Thereafter, the stirring was stopped, the reaction solution was settled for 30 minutes and decanted.

Into the reactor, 2.5 kg of toluene was introduced, 9.4 kg of 10 wt % methylaluminoxane (MAO)/toluene solution was introduced, and then, the solution was stirred at 40° C. at 200 rpm for 12 hours. After the reaction, the stirring was stopped, the reaction solution was settled for 30 minutes and decanted. 3.0 kg of toluene was introduced and stirred for 10 minutes, and then, the stirring was stopped, the solution was settled for 30 minutes and decanted.

Into the reactor, 3.0 kg of toluene was introduced, and 236 mL of 29.2 wt % metallocene compound of Preparation Example 2/toluene solution was introduced, and the solution was stirred at 40° C. at 200 rpm for 2 hours to react. The temperature of the reactor was decreased to a room temperature, and then, the stirring was stopped, and the reaction solution was settled for 30 minutes and decanted.

Into the reactor, 2.0 kg of toluene was introduced, the solution was stirred for 10 minutes, and then, the stirring was stopped, and the reaction solution was settled for 30 minutes and decanted.

Into the reactor, 3.0 kg of hexane was introduced, the hexane slurry was transferred to a filter drier, and the hexane solution was filtered. By drying under reduced pressure at 40° C. for 4 hours, 910 g-SiO$_2$ hybrid supported catalyst was prepared.

Preparation Example 5: Preparation of Supported Catalyst

A hybrid supported catalyst was prepared by the same method as Preparation Example 4, except that the metallocene compound of Preparation Example 3 was used instead of the metallocene compound of Preparation Example 2.

[Preparation of Polyethylene]

Example 1

Into a 220 L reactor of pilot plant, the supported catalyst prepared in Preparation Example 4 was introduced in a single slurry polymerization process to prepare high density polyethylene according to a standard method. 15 kg/hr of ethylene and 0.1 g/hr of hydrogen were continuously reacted at the reactor temperature of 82° C. in the state of hexane slurry, followed by removal of the solvent and drying to obtain high density polyethylene in the form of powder.

Example 2

High density polyethylene in the form of powder was prepared by the same method as Example 1, except that the supported catalyst prepared in Preparation Example 5 was used instead of the supported catalyst prepared in Preparation Example 4.

Example 3

High density polyethylene in the form of powder was prepared by the same method as Example 2, except that hydrogen input was 0.2 g/hr.

Comparative Example 1

High density polyethylene in the form of powder was prepared by the same method as Example 1, except that hydrogen input was 0.3 g/hr.

Comparative Example 2

High density polyethylene in the form of powder was prepared by the same method as Comparative Example 1, except that hydrogen input was 0.5 g/hr, and 1-butene input was 10 cc/min.

Comparative Example 3

High density polyethylene in the form of powder was prepared by the same method as Comparative Example 2, except that the reactor temperature was 83° C.

Comparative Example 4

High density polyethylene in the form of powder was prepared by the same method as Example 1, except that ethylene input was 20 kg/hr, and hydrogen input was 1.0 g/hr.

Comparative Example 5

High density polyethylene in the form of powder was prepared by the same method as Example 1, except that hydrogen input was 0.2 g/hr, and 1-butene input was 10 cc/min.

EXPERIMENTAL EXAMPLES

Experimental Example 1

For the polyethylene prepared in Examples and Comparative Examples, the properties were measured as follows, and the results were shown in the following Table 1.

1) Density

The density (g/cm$^3$) of polyethylene was measured by the method of ASTM D 1505.

2) Melt Index (MI, g/10 Minutes):

Melt index was measured at 230° C. under 5 kg load according to the method of ASTM D 1238, and expressed as the mass (g) of polymer that is molten and flows out for 10 minutes.

3) Molecular Weight (Mn, Mw, g/Mol) and Molecular Weight Distribution (PDI, Polydispersity Index)

Using GPC (gel permeation chromatography, manufactured by Agilent), the weight average molecular weight (Mw) and number average molecular weight (Mn) of the polymer were measured, and the weight average molecular weight was divided by the number average molecular weight to calculate polydispersity index (PDI).

Specifically, as gel permeation chromatography (GPC) device, Agilent PL-GPC220 was used, and Polymer Laboratories PLgel MIX-B 300 mm length column was used. Here, the measurement temperature was 160° C., 1,2,4-trichlorobenzene was used as a solvent, and flow rate was set to 1 mL/min. Each polyethylene sample obtained using the metallocene supported catalysts of Preparation Examples 1 to 2 and Comparative Preparation Example 1 using the metallocene compounds prepared in Examples and Comparative Examples was pretreated by dissolving in 1,2,4-trichlorobenzene containing 0.0125% BHT at 160° C. for 10 hours, and prepared at the concentration of 10 mg/10 mL, and then, fed in the amount of 200 μL, using GPC analysis equipment (PL-GP220). Mw and Mn were derived from a calibration curve formed using a polystyrene standard specimen. As the polystyrene standard specimen, 9 kinds having weight average molecular weight of 2000 g/mol, 10000 g/mol, 30000 g/mol, 70000 g/mol, 200000 g/mol, 700000 g/mol, 2000000 g/mol, 4000000 g/mol, 10000000 g/mol were used.

4) Melting Temperature (Tm)

The melting point, melting temperature (Tm) of polyethylene was measured using a differential scanning calorimeter (DSC, device name: Q20, manufacturing company: TA Instruments). Specifically, the polymer was heated to 190° C. to heat polyethylene, maintained at that temperature for 5 minutes, the temperature was decreased to 50° C., and then, the temperature was increased again, and a temperature corresponding to the top of the DSC (Differential Scanning calorimeter, manufactured by TA Instruments) curve was defined as the melting temperature (Tm). Here, temperature increase and decrease rates are respectively 10° C./min, and as the melting temperature, the result measured in the second temperature increase/decrease section was used.

5) Crystallinity

The crystallinity of polyethylene was measured using a differential scanning calorimeter (DSC, device name: Q20, manufacturing company: TA Instruments). Specifically, a temperature was increased to 190° C. to heat polyethylene, maintained at that temperature for 5 minutes, decreased to 50° C., and then, increased again, and in the obtained DSC (Differential Scanning calorimeter, manufactured by TA Instruments) analysis result, the area of the melting peak in the second temperature increase section was calculated as heat of fusion ΔHm, which was divided by a theoretical value $H°m=293.6$ J/g at crystallinity of 100%, thus calculating crystallinity.

6) Tie Molecule Fraction

Tie molecule fraction was calculated by the above explained Equation 4, using the GPC curve data and melting point measured as explained above.

7) Crystal Structure Transition Temperature

Using a dynamic mechanical analyzer (DMA), a temperature was decreased to −60° C., maintained at that temperature for 5 minutes, and then, increased to 140° C., and the top of the tan δ curve was measured as the crystal structure transition temperature.

8) Endothermic Initiation Temperature

In the above explained DSC analysis result, a temperature at which the onset of a melting peak occurs in the second temperature increase section was measured as the endothermic initiation temperature.

As shown in Table 1, it can be confirmed that in Examples, crystal structure transition temperatures and tie molecule fractions are high, compared to Comparative Examples.

Experimental Example 2

Using the polyethylene prepared in Examples and Comparative Examples, chlorinated polyethylene was prepared.

[Preparation of Chlorinated Polyethylene]

Into a reactor, 5000 L of water and 550 kg of high density polyethylene prepared in Example 1 were introduced, and then, sodium polymethacrylate as a dispersant, oxypropylene and oxyethylene copolyether as emulsifying agents, and benzoyl peroxide as a catalyst were introduced, and gas phase chlorine was introduced to progress chlorination at the final temperature of 132° C. for 3 hours. The chlorinated reaction product was introduced into NaOH to neutralize for 4 hours, and it was washed with flowing water for 4 hours, and then, finally dried at 120° C. to prepare chlorinated polyethylene in the form of powder.

Further, using the polyethylene prepared in Examples 2 to 3 and Comparative Examples 1 to 3, chlorinated polyethylene in the form of powder was respectively prepared by the same method as described above.

In the preparation process of chlorinated polyethylene as explained above, the total chlorination time and daily production amount according to the use of polyethylene prepared in Examples and Comparative Examples were measured, and the results were shown in the following Table 2.

TABLE 2

The rate of time required for chlorination (%) and the rate of CPE daily production (%) are based on Comparative Example 1

| | Example | | | Comparative Example | | | | |
|---|---|---|---|---|---|---|---|---|
| | 1 | 2 | 3 | 1 | 2 | 3 | 4 | 5 |
| Blocking generation | Not generated | Not generated | Not generated | generated | generated | generated | generated | generated |

TABLE 1

| | Example | | | Comparative Example | | | | |
|---|---|---|---|---|---|---|---|---|
| | 1 | 2 | 3 | 1 | 2 | 3 | 4 | 5 |
| Density (g/cm$^3$) | 0.951 | 0.951 | 0.955 | 0.951 | 0.948 | 0.950 | 0.950 | 0.945 |
| MI (5 kg, g/10 min) | 0.75 | 0.23 | 0.91 | 1.6 | .3 | 2.5 | 0.63 | 1.0 |
| Mw (X1000 g/mol) | 161 | 201 | 163 | 126 | 50 | 143 | 223 | 159 |
| Polydispersity index (Mw/Mn) | 3.4 | 4.4 | 6.9 | 4.8 | 6.3 | 6.1 | 11.6 | 6.7 |
| Melting temperature (Tm, ° C.) | 135.8 | 136.3 | 135.6 | 133.4 | 132.8 | 133.0 | 132.6 | 131.5 |
| Crystallinity (%) | 55.8 | 57.2 | 56.7 | 53.7 | 51.1 | 50.3 | 56.0 | 55.1 |
| Tie Molecule fraction (%) | 3.2 | 3.5 | 3.1 | 1.6 | 4.2 | 3.9 | 6.3 | 5.8 |
| Crystal structure transition temperature (° C.) | 108.2 | 122.1 | 120.9 | 105.4 | 107.8 | 103.2 | 108.5 | 101.7 |
| Endothermic initiation temperature (° C.) | 126.4 | 126.8 | 126.3 | 124.5 | 122.3 | 123.1 | 121.8 | 122.1 |

TABLE 2-continued

The rate of time required for chlorination (%) and the rate of CPE daily production (%) are based on Comparative Example 1

| | Example | | | Comparative Example | | | | |
|---|---|---|---|---|---|---|---|---|
| | 1 | 2 | 3 | 1 | 2 | 3 | 4 | 5 |
| Rate of time required for chlorination (%) | 75 | 65 | 80 | 100 | 107 | 103 | 106 | 124 |
| Rate of CPE daily production (%) | 144 | 167 | 120 | 100 | 94 | 97 | 94 | 81 |

As shown in Table 2, it can be confirmed that compared to Comparative Examples, in Examples, blocking was not generated during chlorination, a time required for chlorination decreased, and CPE daily production increased.

Particularly, it can be seen that Examples 1 to 3 exhibited excellent effects of significantly reducing a time required for chlorination to about 65% to about 80%, and remarkably increasing CPE daily production to about 120% to about 167%, compared to Comparative Example 1. To the contrary, it can be seen that in Comparative Examples 2 to 5, a time required for chlorination increased to about 103% to about 124%, and CPE daily production decreased to about 81% to about 97%, compared to Comparative Example 1.

Meanwhile, after completing the chlorination process using polyethylene according to Example 1 and Comparative Example 1, SEM images were analyzed so as to compare the morphology of chlorinated polyethylene, and the results were respectively shown in FIG. 2 and FIG. 3. As shown in FIG. 2, it can be seen that Example 1 mostly has irregular shapes and rough surfaces. To the contrary, it can be confirmed that Comparative Example 1 has dent shapes and smooth surfaces. The reason is that in the case of Example 1, changes in particle surface and internal structure were small during the chlorination process. Meanwhile, in the case of Comparative Example 1, pores are blocked due to surface melting during the chlorination process, thus making the surface smooth, and moisture trapped in the particles is removed during the drying process, thus forming a dent shape.

Thus, it can be confirmed that the morphology of chlorinated polyethylene according to the present invention is more excellent.

The invention claimed is:

1. Polyethylene having a molecular weight distribution (Mw/Mn) of 2 to 10,
    a tie molecule fraction of 3% or more,
    a crystal structure transition temperature of 108° C. or more,
    an endothermic initiation temperature of 125° C. or more,
    a melt temperature of 135.6° C. or more, and
    a density of 0.951 g/cm³ or more.
2. The polyethylene according to claim 1, wherein the polyethylene is ethylene homopolymer.
3. The polyethylene according to claim 1, wherein the polyethylene has a weight average molecular weight of 50000 g/mol to 250000 g/mol.
4. The polyethylene according to claim 1, wherein the polyethylene has a crystallinity of 55% or more.
5. The polyethylene according to claim 1, which has a melt index of 0.1 g/10 min to 10 g/10 min measured under temperature of 230° C. and load of 5 kg according to ASTM D1238.
6. The polyethylene according to claim 1, wherein the polyethylene is prepared by polymerizing ethylene in the presence of a metallocene catalyst comprising at least one selected from the group consisting of compounds represented by the following Chemical Formulas 1 to 4:

  [Chemical Formula 1]

$(Cp^1R^a)_n(Cp^2R^b)M^1Z^1_{3-n}$  [Chemical Formula 1]

in the Chemical Formula 1,
$M^1$ is Group 4 transition metal;
$Cp^1$ and $Cp^2$ are identical to or different from each other, and are each independently, one selected from the group consisting of cyclopentadienyl, indenyl, 4,5,6,7-tetrahydro-1-indenyl, and fluorenyl radicals, each of which is optionally substituted with hydrocarbon having a carbon number of 1 to 20;
$R^a$ and $R^b$ are identical to or different from each other, and are each independently, hydrogen, $C_{1-20}$ alkyl, $C_{1-10}$ alkoxy, $C_{2-20}$ alkoxyalkyl, $C_{6-20}$ aryl, $C_{6-10}$ aryloxy, $C_{2-20}$ alkenyl, $C_{7-40}$ alkylaryl, $C_{7-40}$ arylalkyl, $C_{8-40}$ arylalkenyl, or $C_{2-10}$ alkynyl;
$Z^1$ is a halogen atom, $C_{1-20}$ alkyl, $C_{2-10}$ alkenyl, $C_{7-40}$ alkylaryl, $C_{7-40}$ arylalkyl, $C_{6-20}$ aryl, substituted or unsubstituted $C_{1-20}$ alkylidene, or substituted or unsubstituted amino, $C_{2-20}$ alkylalkoxy, or $C_{7-40}$ arylalkoxy;
n is 1 or 0;

  [Chemical Formula 2]

$(Cp^3R^c)_mB^1(Cp^4R^d)M^2Z^2_{3-m}$  [Chemical Formula 2]

in the Chemical Formula 2,
$M^2$ is Group 4 transition metal;
$Cp^3$ and $Cp^4$ are identical to or different from each other, and are each independently, one selected from the group consisting of cyclopentadienyl, indenyl, 4,5,6,7-tetrahydro-1-indenyl and fluorenyl radicals, each of which is optionally substituted with hydrocarbon having a carbon number of 1 to 20;
$R^c$ and $R^d$ are identical to or different from each other, and are each independently, hydrogen, $C_{1-20}$ alkyl, $C_{1-10}$ alkoxy, $C_{2-20}$ alkoxyalkyl, $C_{6-20}$ aryl, $C_{6-10}$ aryloxy, $C_{2-20}$ alkenyl, $C_{7-40}$ alkylaryl, $C_{7-40}$ arylalkyl, $C_{8-40}$ arylalkenyl, or $C_{2-10}$ alkynyl;
$Z^2$ is a halogen atom, $C_{1-20}$ alkyl, $C_{2-10}$ alkenyl, $C_{7-40}$ alkylaryl, $C_{7-40}$ arylalkyl, $C_{6-20}$ aryl, substituted or unsubstituted $C_{1-20}$ alkylidene, or substituted or unsubstituted amino, $C_{2-20}$ alkylalkoxy, or $C_{7-40}$ arylalkoxy;
$B^1$ is carbon, germanium, silicon, phosphorus or nitrogen-containing radicals, or a combination thereof, which crosslinks the $Cp^3R^c$ ring and the $Cp^4R^d$ ring, or crosslinks the $Cp^4R^d$ ring and $M^2$;
m is 1 or 0;

  [Chemical Formula 3]

$(Cp^5R^e)B^2(J)M^3Z^3_2$  [Chemical Formula 3]

in the Chemical Formula 3,
$M^3$ is Group 4 transition metal;
$Cp^5$ is one selected from the group consisting of cyclopentadienyl, indenyl, 4,5,6,7-tetrahydro-1-indenyl and fluorenyl radicals, each of which is optionally substituted with hydrocarbon having a carbon number of 1 to 20;
$R^e$ is hydrogen, $C_{1-20}$ alkyl, $C_{1-10}$ alkoxy, $C_{2-20}$ alkoxyalkyl, $C_{6-20}$ aryl, $C_{6-10}$ aryloxy, $C_{2-20}$ alkenyl, $C_{7-40}$ alkylaryl, $C_{7-40}$ arylalkyl, $C_{8-40}$ arylalkenyl, or $C_{2-10}$ alkynyl;
$Z^3$ is a halogen atom, $C_{1-20}$ alkyl, $C_{2-10}$ alkenyl, $C_{7-40}$ alkylaryl, $C_{7-40}$ arylalkyl, $C_{6-20}$ aryl, substituted or unsubstituted $C_1$-20 alkylidene, substituted or unsubstituted amino, $C_{2-20}$ alkylalkoxy, or $C_{7-40}$ arylalkoxy;

B² is carbon, germanium, silicon, phosphorus or nitrogen-containing radicals or a combination thereof, which crosslinks the Cp⁵Rᵉ ring and J; and J is one selected from the group consisting of NR$^f$, O, PR$^f$ and S, wherein R$^f$ is $C_{1-20}$ alkyl, aryl, substituted alkyl, or substituted aryl;

[Chemical Formula 4]

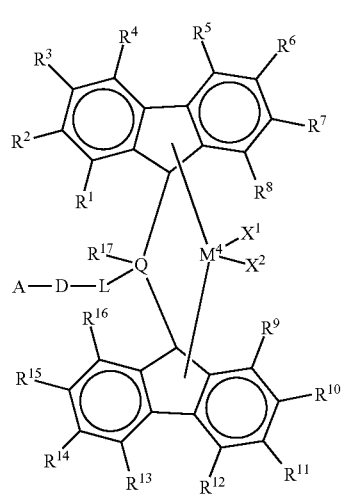

in the Chemical Formula 4, $R^1$ to $R^{17}$ are identical to or different from each other, and each independently, hydrogen, halogen, $C_{1-20}$ alkyl, $C_{2-20}$ alkenyl, $C_{6-20}$ aryl, $C_{7-20}$ alkylaryl, or $C_{7-20}$ arylalkyl;

L is $C_{1-10}$ linear or branched alkylene;

D is —O—, —S—, —N(R)— or —Si(R)(R')—, wherein R and R' are identical to or different from each other, and each independently, hydrogen, halogen, $C_{1-20}$ alkyl, $C_{2-20}$ alkenyl, or $C_{6-20}$ aryl;

A is hydrogen, halogen, $C_{1-20}$ alkyl, $C_{2-20}$ alkenyl, $C_{6-20}$ aryl, $C_{7-20}$ alkylaryl, $C_{7-20}$ arylalkyl, $C_{1-20}$ alkoxy, $C_{2-20}$ alkoxyalkyl, $C_{2-20}$ heterocycloalkyl, or $C_{5-20}$ heteroaryl;

Q is carbon, silicon or germanium;

M⁴ is Group 4 transition metal;

$X^1$ and $X^2$ are identical to or different from each other, and each independently, halogen, $C_{1-20}$ alkyl, $C_{2-20}$ alkenyl, $C_{6-20}$ aryl, nitro, amido, $C_{1-20}$ alkylsilyl, $C_{1-20}$ alkoxy, or $C_{1-20}$ sulfonate.

7. Chlorinated polyethylene prepared by reacting the polyethylene according to claim 1 with chlorine.

8. The polyethylene according to claim 1, wherein the tie molecule fraction is about 6.0% % or less.

9. The polyethylene according to claim 1, wherein the crystal structure transition temperature is about 132° C. or less.

10. The polyethylene according to claim 1, wherein the endothermic initiation temperature is about 134° C. or less.

11. The polyethylene according to claim 6, wherein the compound represented by the Chemical Formula 1 comprises a compound represented one of the following Structural Formulas:

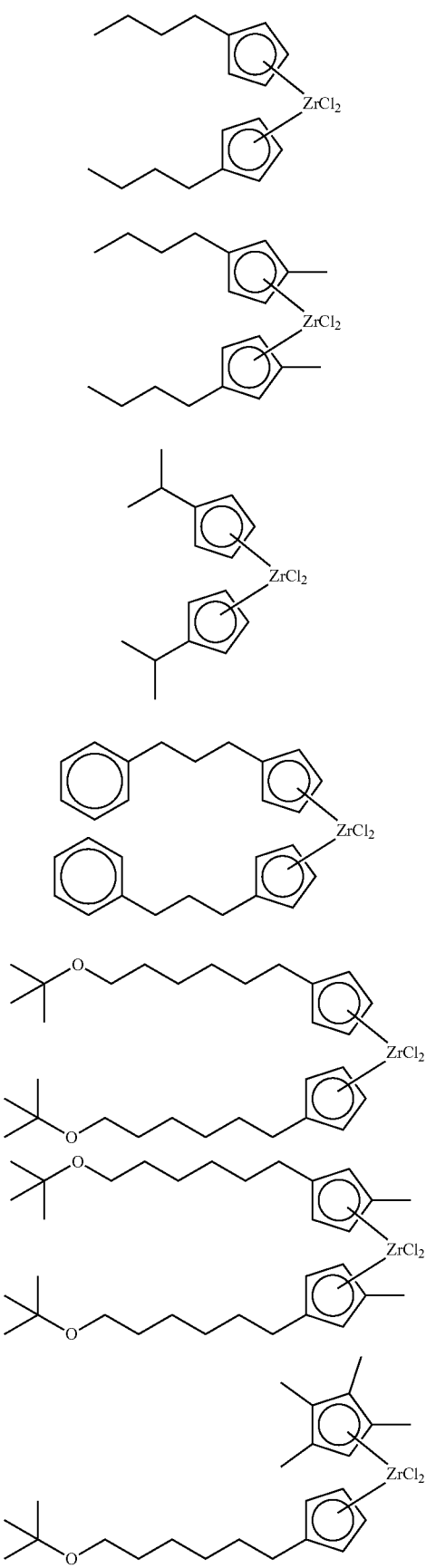

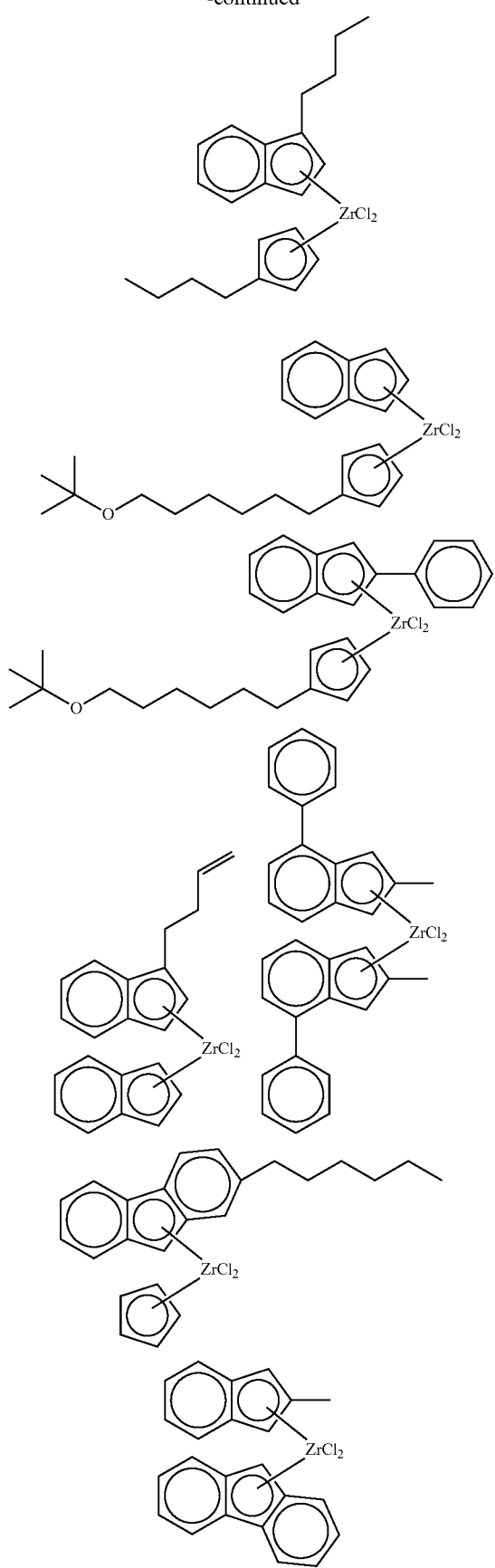
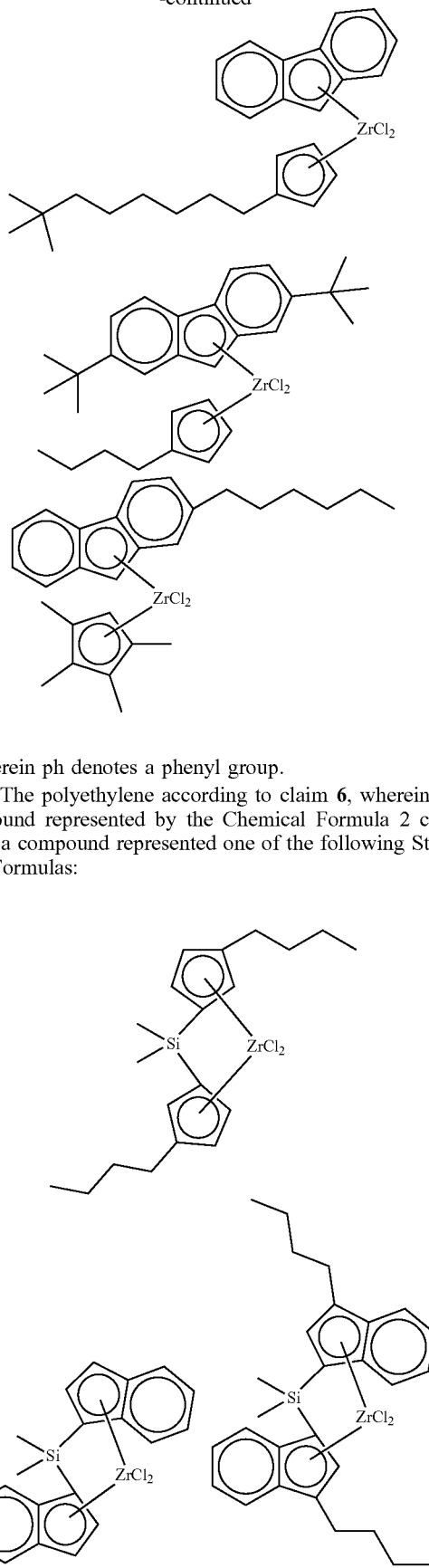
wherein ph denotes a phenyl group.
12. The polyethylene according to claim 6, wherein the compound represented by the Chemical Formula 2 comprises a compound represented one of the following Structural Formulas:

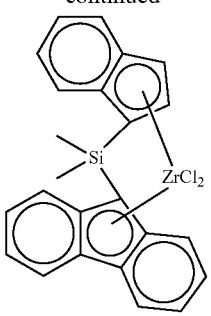
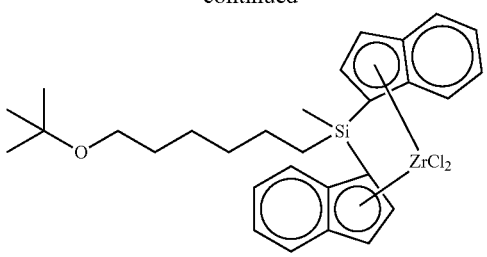
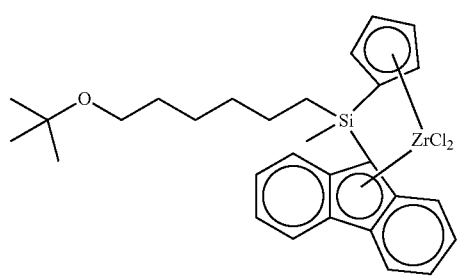
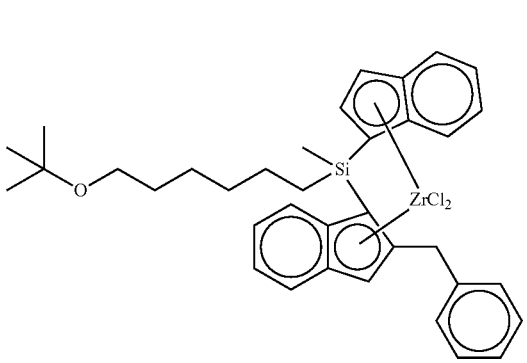
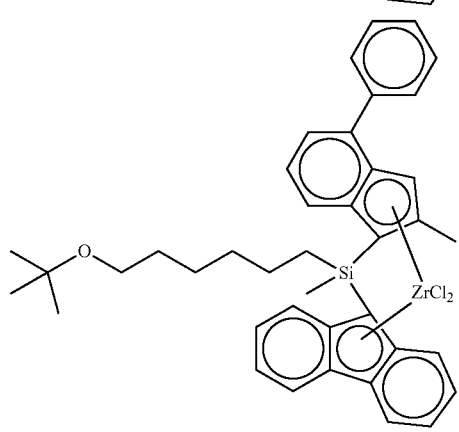
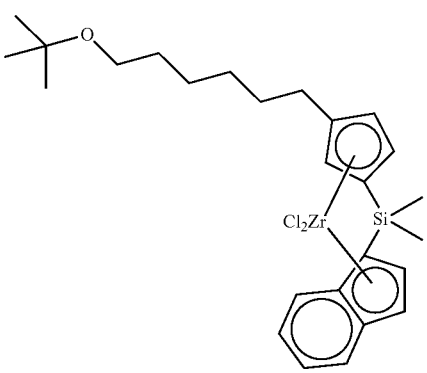
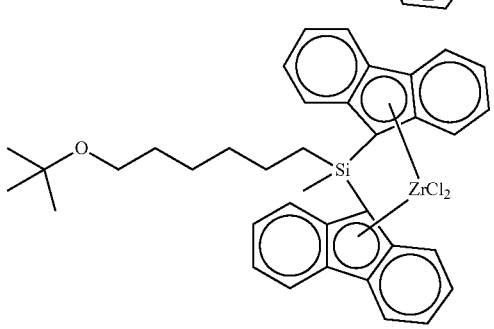
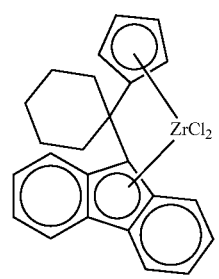
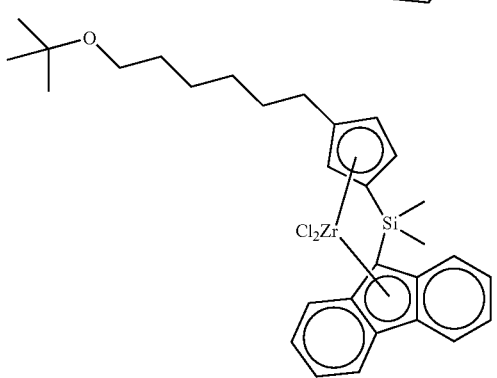
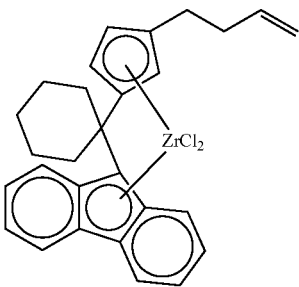

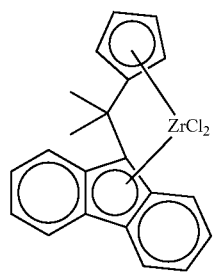
wherein ph denotes a phenyl group.
13. The polyethylene according to claim 6, wherein the compound represented by the Chemical Formula 3 comprises a compound represented one of the following Structural Formulas:
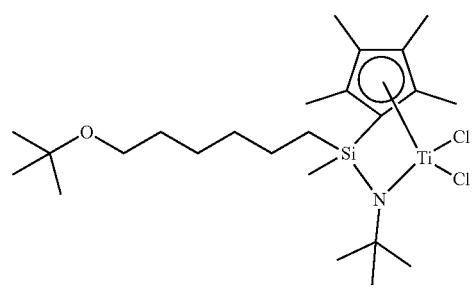
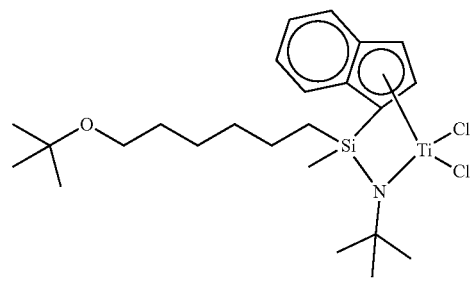
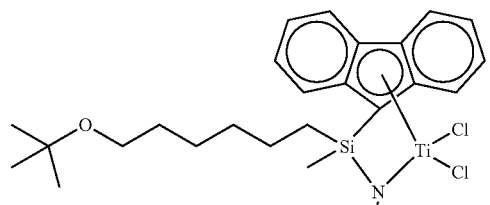
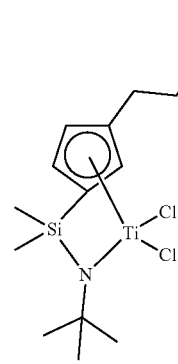
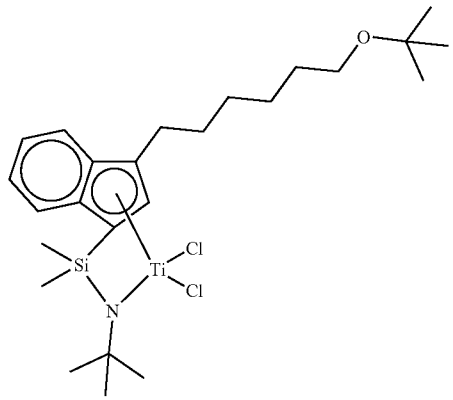
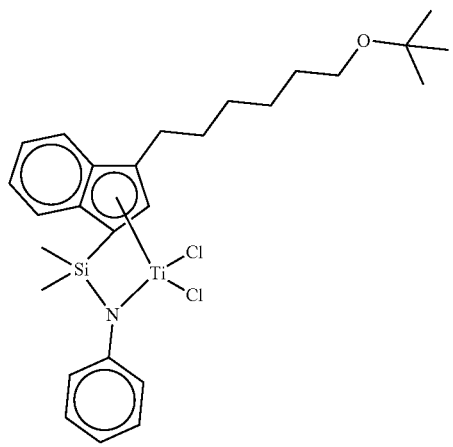
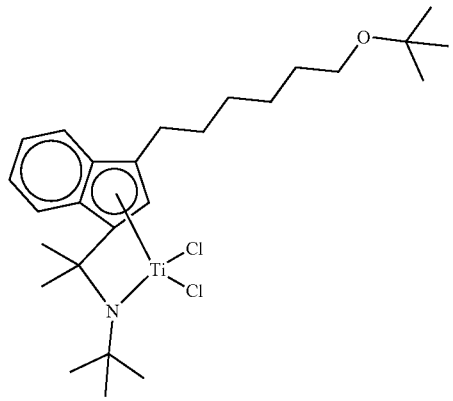

-continued

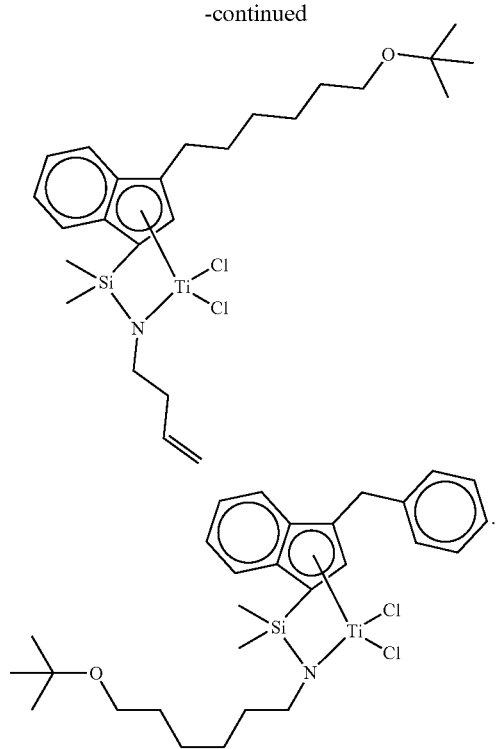

14. The polyethylene according to claim 6, wherein the compound represented by the Chemical Formula 4 comprises a compound represented the following Structural Formula:

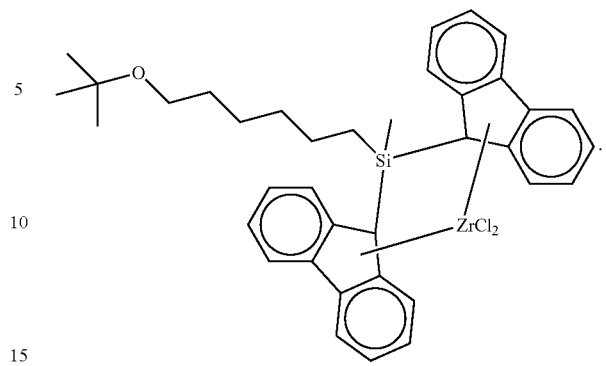

15. The polyethylene according to claim 6, wherein the metallocene catalyst comprises at least one first compound represented by the Chemical Formula 1, and at least one second compound represented by the Chemical Formulas 2, 3 or 4.

16. The polyethylene according to claim 6, wherein hydrogen gas is introduced during the polymerization, and the hydrogen gas is introduced in an amount of about 0.1 g/h to about 0.2 g/hr, based on an introduction of 15 kg/hr of the ethylene.

17. The polyethylene according to claim 6, wherein the metallocene catalyst further comprises a cocatalyst.

* * * * *